(12) United States Patent
Hirabayashi et al.

(10) Patent No.: US 8,161,021 B2
(45) Date of Patent: Apr. 17, 2012

(54) RECORDING APPARATUS, REPRODUCTION APPARATUS, AND FILE MANAGEMENT METHOD

(75) Inventors: Mitsuhiro Hirabayashi, Tokyo (JP);
Fumitaka Kawate, Kanagawa (JP);
Toshihiro Ishizaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 336 days.

(21) Appl. No.: 11/895,521

(22) Filed: Aug. 24, 2007

(65) Prior Publication Data

US 2008/0056074 A1 Mar. 6, 2008

Related U.S. Application Data

(62) Division of application No. 10/760,092, filed on Jan. 19, 2004.

(30) Foreign Application Priority Data

Jan. 21, 2003 (JP) .................................. 2003-011827

(51) Int. Cl.
*G06F 7/00* (2006.01)
(52) U.S. Cl. .................. 707/705; 707/769; 717/100
(58) Field of Classification Search ................. None
See application file for complete search history.

(56) References Cited

U.S. PATENT DOCUMENTS 5,440,401 A 8/1995 Kristy et al.
6,434,103 B1* 8/2002 Shitara et al. ................... 369/83
2001/0054168 A1* 12/2001 Chung et al. .................. 714/763
2002/0099722 A1* 7/2002 Kimura et al. ................ 707/200
2005/0021809 A1* 1/2005 Zhu et al. ...................... 709/231

FOREIGN PATENT DOCUMENTS

| EP | 1 085 515 | 3/2001 |
| EP | 1 296 519 | 3/2003 |
| EP | 1 372 087 | 12/2003 |
| WO | WO 02 067582 | 8/2002 |
| WO | WO 02 077865 | 10/2002 |
| WO | WO 03 025933 | 3/2003 |

OTHER PUBLICATIONS

Patent Abstracts of Japan vol. 1997, No. 12, Dec. 25, 1997 & JP 09 213056 A (Sharp Corp), Aug. 15, 1997.

* cited by examiner

*Primary Examiner* — Tim T Vo
*Assistant Examiner* — Hasanul Mobin
(74) *Attorney, Agent, or Firm* — Frommer Lawrence & Haug LLP; William S. Frommer; Thomas F. Presson

(57) ABSTRACT

A recording apparatus, a reproduction apparatus, and a file management method are disclosed wherein the operability in management of a large number of files recorded on a recording medium using an index file can be improved significantly further than ever. An index file is formed from a series of entries of extract information from a large number of files. Information indicative of a relationship between the files is set to the index file. The index file is used to manage a large number of files and so forth recorded on a recording medium.

6 Claims, 35 Drawing Sheets

FIG. 5

| RBP | Length | Field Name |
|---|---|---|
| 0 | L_AP1 | AV File Property #1 |
| L_AP1 | L_AP2 | AV File Property #2 |
| L_AP1+L_AP2 | L_AP3 | AV File Property #3 |
| ⋮ | ⋮ | ⋮ |
|  | L_APn | AV File Property #n |

FIG. 6

| RBP | Length | Field Name |
|---|---|---|
| 0 | L_AT1 | AV File Title #1 |
| L_AT1 | L_AT2 | AV File Title #2 |
| L_AT1+L_AT2 | L_AT3 | AV File Title #3 |
| ⋮ | ⋮ | ⋮ |
|  | L_ATn | AV File Title #n |

FIG. 7

| RBP | Length | Field Name |
|---|---|---|
| 0 | L_TH1 | AV File Thumbnail Picture #1 |
| L_TH1 | L_TH2 | AV File Thumbnail Picture #2 |
| L_TH1+L_TH2 | L_TH3 | AV File Thumbnail Picture #3 |
| ⋮ | ⋮ | ⋮ |
|  | L_THn | AV File Thumbnail Picture #n |

FIG. 8

| RBP | Length | Field Name |
|---|---|---|
| 0 | L_IS1 | AV File Intro Music #1 |
| L_IS1 | L_IS2 | AV File Intro Music #2 |
| L_IS1+L_IS2 | L_IS3 | AV File Intro Music #3 |
| ⋮ | ⋮ | ⋮ |
|  | L_ISn | AV File Intro Music #n |

FIG. 9

| RBP | Length | Data |
|---|---|---|
| 0 | 16 | Property Entry Header |
| 16 | 32 | Basic Property Data |
| 56 | L P EX | Property Extension Data |

FIG. 10

| RBP | Length | Field Name |
|---|---|---|
| 0 | 2 | Entry Number |
| 2 | 2 | Parent Entry Number |
| 4 | 2 | Property Entry Flags |
| 6 | 2 | Play-order |
| 8 | 4 | Entry Data Size |
| 12 | 2 | Next-extends-entry |
| 14 | 2 | reserved |

| Entry Number | 0 | 1 | 2 | 3 | 4 | 5 | 6 | 7 |
|---|---|---|---|---|---|---|---|---|
| PE-Flags(1) 0:Folder 1:File | 0 | 1 | 1 | 0 | 0 | 1 | 1 | 1 |
| PE-Flags(0) 0:Original 1:Favorite | 0 | 0 | 0 | 0 | 0 | 0 | 0 | 0 |
| Parent Entry Number | X | 0 | 0 | 0 | 3 | 3 | 4 | 4 |
| Binary File Identifier/URL | X | File-a | File-b | X | X | File-c | File-d | File-e |

▱ : ORIGINAL FOLDER

▭ : ORIGINAL DATA

FIG. 13

| Bit | Field Name |
|---|---|
| 15:14 | Reserved |
| 13 | Intro Music Entry has extended |
| 12 | Thumbnail Entry has extended |
| 11 | Title Entry has extended |
| 10 | Parent File |
| 9 | Child File |
| 8 | Reference |
| 7:5 | Reserved |
| 4 | Valid |
| 3 | Reserved |
| 2 | Extends |
| 1 | File/Folder |
| 0 | Original/Favorite |

| Entry Number | 0 | 1 | 2 | 3 | 4 | 5 | 6 | 7 | 8 | 9 | 10 |
|---|---|---|---|---|---|---|---|---|---|---|---|
| PE-Flags(1)  0:Folder  1:File | 0 | 1 | 1 | 0 | 0 | 1 | 1 | 1 | 0 | 1 | 1 |
| PE-Flags(0)  0:Original  1:Favorite | 0 | 0 | 0 | 0 | 0 | 0 | 0 | 0 | 1 | 1 | 1 |
| Parent Entry Number | x | 0 | 0 | 0 | 3 | 3 | 4 | 4 | 0 | 8 | 8 |
| Play-Order | x | 1 | 5 | x | x | 2 | 4 | 3 | 1 | 2 | 1 |
| Binary File Identifier/URL | x | File-a | File-b | x | x | File-c | File-d | File-e | | File-d | File-c |

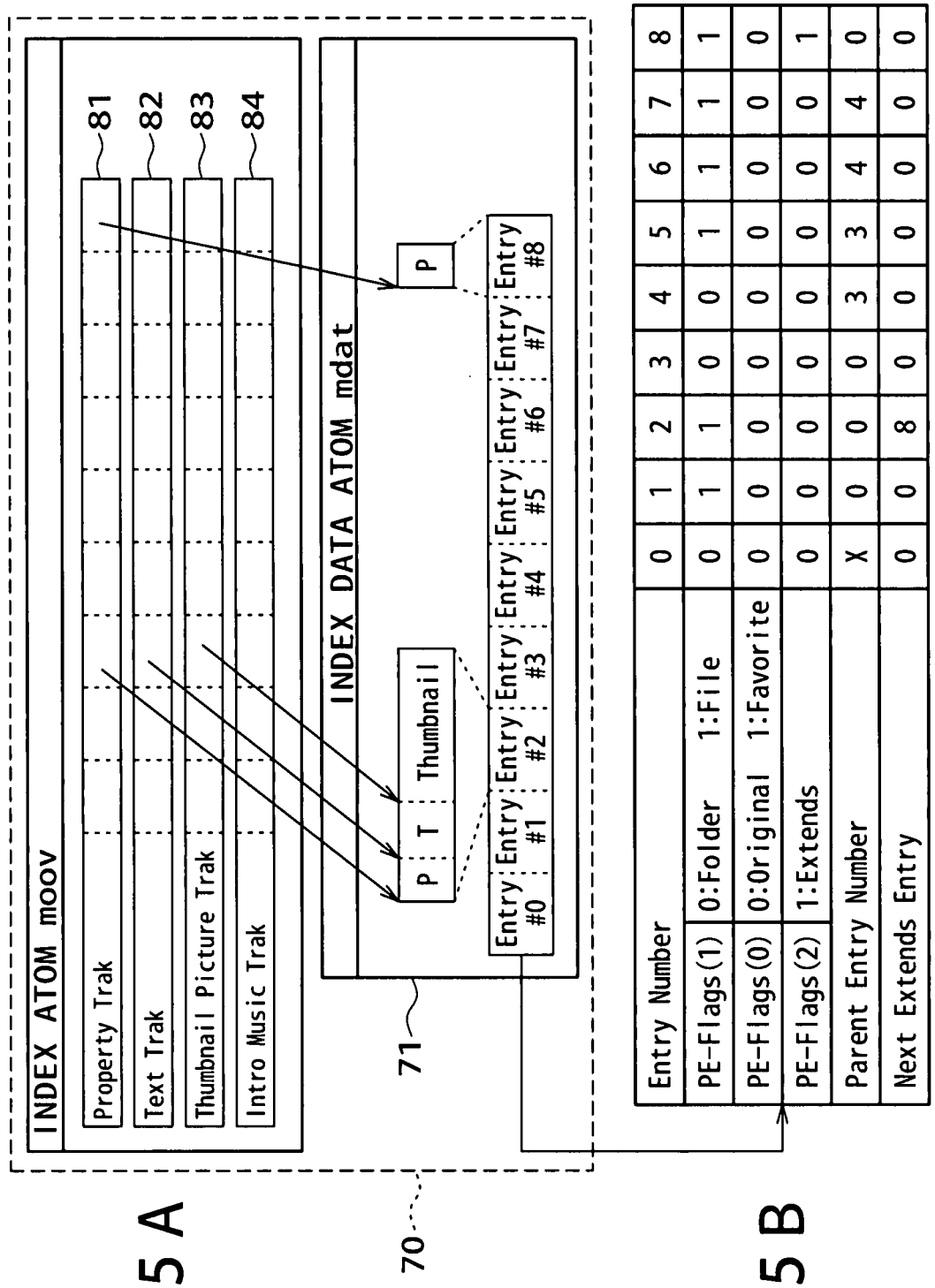
F I G. 15A
F I G. 15B

| Entry Number | 0 | 1 | 2 | 3 | 4 | 5 | 6 |
|---|---|---|---|---|---|---|---|
| PE-Flags(1)  0:Folder  1:File | 0 | 1 | 1 | 1 | 1 | 1 | 1 |
| PE-Flags(0)  0:Original  1:Favorite | 0 | 0 | 0 | 0 | 0 | 0 | 0 |
| PE-Flags(10) 1:Parent | 0 | 1 | 0 | 0 | 1 | 0 | 0 |
| PE-Flags(9)  1:Child | 0 | 0 | 1 | 1 | 0 | 1 | 1 |
| PE-Flags(8)  1:Reference | 0 | 1 | 0 | 0 | 1 | 0 | 0 |
| Parent Entry Number | X | 0 | 1 | 1 | 0 | 4 | 4 |
| Referring File Counter | 0 | 0 | 1 | 1 | 0 | 1 | 1 |
| Referred File List | X | X | 1 | 1 | X | 4 | 4 |
F I G. 1 6 A
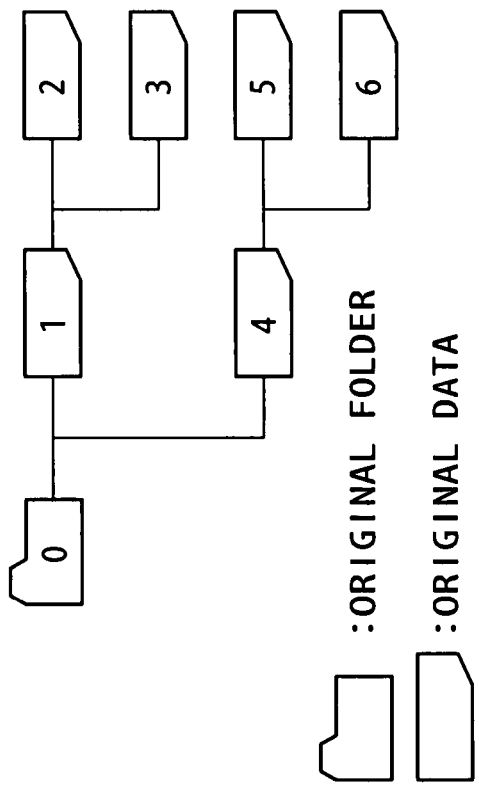
F I G. 1 6 B

| Entry Number | 0 | 1 | 2 | 3 | 4 | 5 | 6 | 7 |
|---|---|---|---|---|---|---|---|---|
| PE-Flags(1) 0:Folder 1:File | 0 | 1 | 1 | 0 | 0 | 1 | 1 | 1 |
| PE-Flags(0) 0:Original 1:Favorite | 0 | 0 | 0 | 0 | 0 | 0 | 0 | 0 |
| Parent Entry Number | | 0 | 0 | 0 | 0 | 3 | 4 | 4 |
| Play Order | X | 1 | 5 | X | 3 | 2 | 4 | 3 |

:ORIGINAL FOLDER

: ORIGINAL DATA

| Entry Number | 0 | 1 | 2 | 3 | 4 | 5 | 6 | 7 |
|---|---|---|---|---|---|---|---|---|
| PE-Flags(1) 0:Folder 1:File | 0 | 1 | 1 | 0 | 0 | 1 | 1 | 1 |
| PE-Flags(0) 0:Original 1:Favorite | 0 | 0 | 0 | 0 | 0 | 0 | 0 | 0 |
| Parent Entry Number | | 0 | 0 | 0 | 3 | 3 | 4 | 4 |
| Play Order | 1 | 5 | 0 | X | X | 7 | 2 | 6 |

FIG. 20

| RBP | Length | Field Name |
|---|---|---|
| 0 | 4 | Format Brand |
| 4 | 4 | Media profile |
| 8 | 2 | Contents status flags |
| 10 | 2 | Reserved |
| 12 | 4 | Creation Time |
| 16 | 4 | Modification Time |
| 20 | 4 | Duration |
| 24 | 6 | Binary File Identifier |
| 30 | 2 | Referred Counter |

FIG. 21

| Bit | Field Name |
|---|---|
| 15:8 | Contents Type |
| 7:6 | Reserved |
| 5 | AV File Has Intro Music |
| 4 | AV File has Thumbnail Picture |
| 3 | AV File has Title |
| 2 | AV Index File has Intro Music of AV File |
| 1 | AV Index File has Thumbnail Picture of AV File |
| 0 | AV Index File has Title of AV File |

FIG. 22

| RBP | Length | Field Name |
|---|---|---|
| 0 | L P RF | Referring File List |
| L P RF | L P GF | Grouping File List |
| L P RF+<br>L P GF | L P UR | URL |
| L P RF+<br>L P GF+<br>L P UR | L P PD *N | Private Property Data [N] |
| L P RF+<br>L P GF+<br>L P UR+<br>L P PD *N | L P PE *M | Private Property Entry [M] |

FIG. 23

| RBP | Length | Field Name |
|---|---|---|
| 0 | 4 | Size |
| 4 | 4 | Type |
| 8 | 2[n] | Referring File Entry Number [n] |

FIG. 24

| RBP | Length | Field Name |
|---|---|---|
| 0 | 4 | Size |
| 4 | 4 | Type |
| 8 | 2[n] | Grouping Entry Number [n] |

| Entry Number | 0 | 1 | 2 | 3 | 4 | 5 | 6 | 7 | 8 |
|---|---|---|---|---|---|---|---|---|---|
| PE-Flags(1) 0:Folder 1:File | 0 | 1 | 1 | 0 | 0 | 1 | 1 | 1 | 0 |
| PE-Flags(0) 0:Original 1:Favorite | 0 | 0 | 0 | 0 | 0 | 0 | 0 | 0 | 1 |
| Parent Entry Number | x | 0 | 0 | 0 | 3 | 3 | 4 | 4 | 0 |
| Play-Order | x | 1 | 5 | x | x | 2 | 4 | 3 | 1 |
| Grouping File List | x | x | x | x | x | x | x | x | 6, 5 |

☐ : ORIGINAL FOLDER
⌐ ¬ : FAVORITE FOLDER
⌞ ⌟
▱ : ORIGINAL DATA

FIG. 26

| RBP | Length | Field Name |
|---|---|---|
| 0 | 4 | Size |
| 4 | 4 | Type |
| 8 | n | URL |

FIG. 27

| RBP | Length | Field Name |
|---|---|---|
| 0 | 4 | Size |
| 4 | 4 | Type |
| 8 | 4 | Owner |
| 12 | n | Private Data |

FIG. 28

| RBP | Length | Field Name |
|---|---|---|
| 0 | 4 | Size |
| 4 | 4 | Type |
| 8 | 4 | Owner |
| 12 | n | Private File URL (Number) |
| 12 + n | 4 | File Offset |
| 16 + n | 4 | Data Size |

FIG. 31

| RBP | Length | Field Name |
|---|---|---|
| 0 | 4 | Size |
| 4 | 4 | Type (=ftyp) |
| 8 | 4 | Major-Brand |
| 12 | 4 | Minor-Version |
| 16 | 4×N | Compatible-Brand [N] |

FIG. 32

| RBP | Length | Field Name |
|---|---|---|
| 0 | 4 | Size |
| 4 | 4 | Type (=prfl) |
| 8 | 1 | Version |
| 9 | 3 | flags |
| 12 | 4 | feature-record-count |
| 15 | 16×N | feature-record-list |

FIG. 33

| RBP | Length | Field Name |
|---|---|---|
| 0 | 4 | track-ID |
| 4 | 4 | sub-part-ID |
| 12 | 4 | feature |
| 16 | 4 | value |

F I G. 34

| feature | MEANING | VALUE (EXAMPLE) |
|---|---|---|
| cdty | TYPE OF CODEC | mp4v(MPEG4 video),mp4a(MPEG4 audio) |
| brat | BIT RATE OF DATA | 64000,96000,128000,192000,384000[bps] |
| frat | VIDEO FRAME RATE | 10,15,24,30[fps] |
| srat | AUDIO SAMPLING FREQUENCY | 24000,48000[Hz] |
| wdth | VIDEO PICTURE SIZE (HORIZONTAL) | 176,352,704,720 |
| hght | VIDEO PICTURE SIZE (VERTICAL) | 120,144,240,288,480,576 |
| frty | FIXED FRAME OR VARIABLE FRAME | cfr(FIXED FRAME RATE),vfr(VARIABLE FRAME RATE) |
| brty | FIXED BIT RATE OR VARIABLE BIT RATE | cbr(FIXED BIT RATE),vbr(VARIABLE BIT RATE) |

F I G. 35

| feature-record-list | | | |
|---|---|---|---|
| track-ID | sub-part-ID | feature | value |
| 1 | 1 | cdty | mp4v |
| 2 | 1 | cdty | mp4a |
| 1 | 1 | brat | 384000 |
| 2 | 1 | brat | 128000 |
| 1 | 1 | frat | 15 |
| 1 | 1 | wdth | 352 |
| 1 | 1 | hght | 288 |
| 2 | 1 | srat | 48000 |
| 1 | 1 | frty | cfr |
| 2 | 1 | brty | cbr |
| ---- | ---- | ---- | ---- | prfl

F I G. 40

| RBP | Length | Field Name |
|---|---|---|
| 0 | 4 | Size |
| 4 | 4 | Type |
| 8 | n | File URL (Number) |
| 8 + n | 4 | File Offset |
| 12 + n | 4 | Data Size |

FIG. 41

| RBP | Length | Field Name |
|---|---|---|
| 0 | 4 | Format Brand |
| 4 | 4 | Media profile |
| 8 | 2 | Contents status flags |
| 10 | 2 | Reserved |
| 12 | 4 | Creation Time |
| 16 | 4 | Modification Time |
| 20 | 4 | Duration |
| 24 | 6 | Binary File Identifier |
| 30 | 2 | Referred Counter |
| 32 | 4 | Title File Offset |
| 36 | 4 | Title Size |
| 40 | 4 | Thumbnail File Offset |
| 44 | 4 | Thumbnail Size |
| 48 | 4 | Intro Music File Offset |
| 52 | 4 | Intro Music Size |

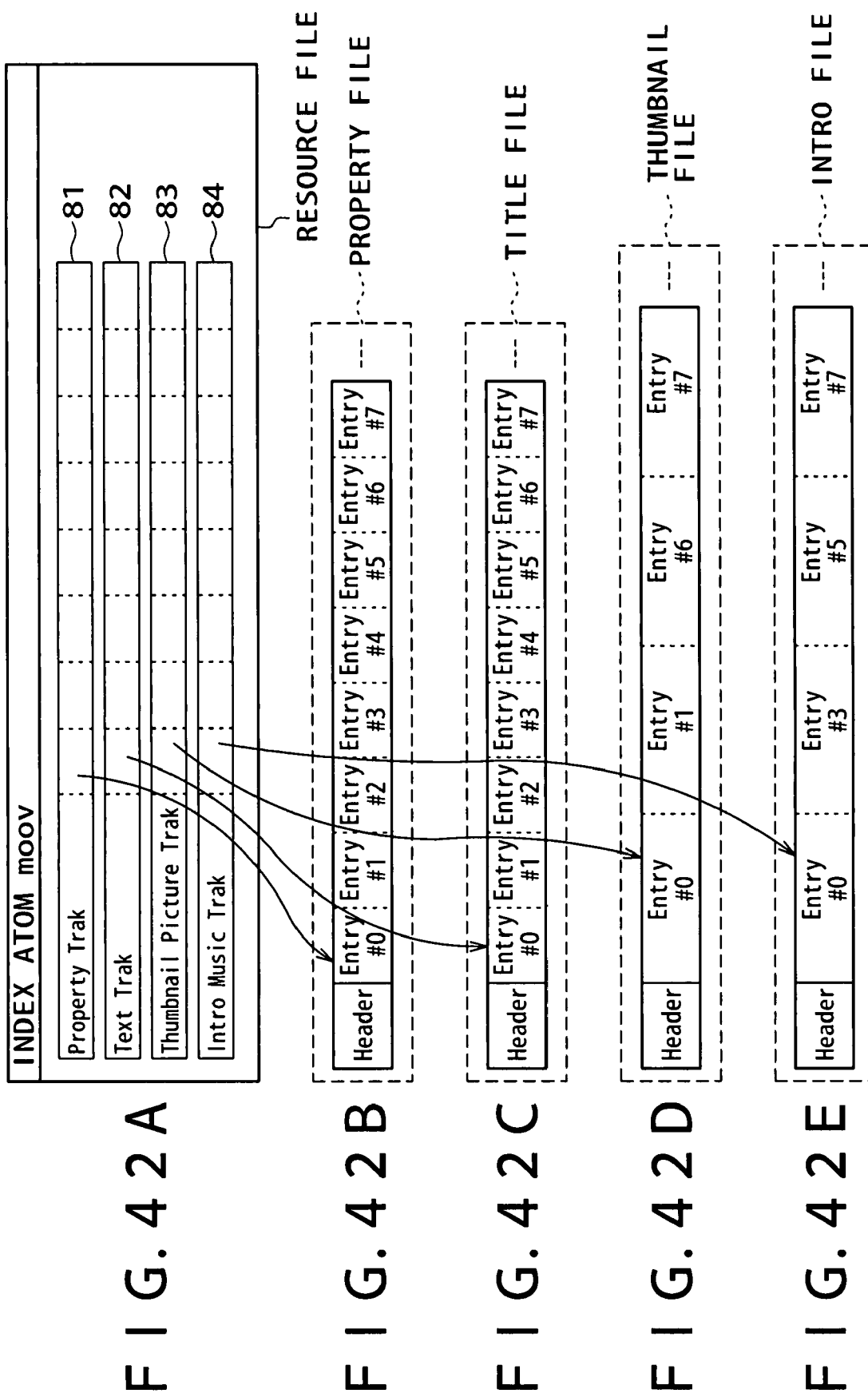

RECORDING APPARATUS, REPRODUCTION APPARATUS, AND FILE MANAGEMENT METHOD

This is a division of application Ser. No. 10/760,092, filed Jan. 19, 2004, which is entitled to the priority filing date of Japanese application 2003-011827 filed on Jan. 21, 2003, the entirety of which is incorporated herein by reference.

BACKGROUND OF THE INVENTION

This invention relates to a recording apparatus, a reproduction apparatus, and a file management method and can be applied, for example, to an optical disk apparatus. More specifically, the present invention relates to a recording apparatus, a reproduction apparatus, and a file management method wherein a large number of files recorded on a recording medium are managed with an index file.

In recent years, many disk apparatus or like apparatus have been proposed wherein a recording medium of a large capacity, which can be accessed at random such as an optical disk, is used to record image pickup results.

A method for a disk apparatus of the type described is disclosed, for example, in Japanese Patent Laid-open No. 2001-84705 (Patent Document 1) wherein an index file is formed from a large number of files recorded on a recording medium and is recorded on the recording medium and used to assure a high operability relating to the large number of files.

Another method is disclosed in Japanese Patent Laid-open No. 2002-278996 (Patent Document 2) wherein a large number of files are hierarchized and managed in and with an index file generated in such a manner as described above to further improve the operability relating to the large number of files.

It is considered preferable if the operability with such an index file as described above can be improved further than ever.

SUMMARY OF THE INVENTION

It is an object of the present invention to provide a recording apparatus, a reproduction apparatus, and a file management method wherein the operability in management of a large number of files recorded on a recording medium using an index file can be improved significantly further than ever.

In order to attain the object described above, according to the present invention, an index file which is formed from a series of entries of extract information from a large number of files recorded on a recording medium and has information indicative of a relationship between the files set thereto is used to manage the large number of files recorded on the recording medium.

In particular, according to an aspect of the present invention, there is provided a recording apparatus for recording desired files on a recording medium, including index file generation means for generating an index file of the files recorded on the recording medium in the form of a series of entries each in the form of a block of extract information relating to and coordinated with one of the files, the index file generation means setting, as information representative of a mutual relationship between the entries, information indicative of a reproduction order of the entries or the files corresponding to the entries to the index file.

With the recording apparatus, as information representative of a mutual relationship between the entries, information indicative of a reproduction order of the entries or the files corresponding to the entries is set to the index file. Consequently, the reproduction order can be designated with the index file. Consequently, the operability can be further improved than ever as much making use of the index file effectively.

According to another aspect of the present invention, there is provided a recording apparatus for recording desired files on a recording medium, including index file generation means for generating an index file of the files recorded on the recording medium in the form of a series of entries each in the form of a block of extract information relating to and coordinated with one of the files, the index file generation means dividing the extract information relating to any of the files to generate the index file which includes a plurality of entries, the index file generation means setting, to the entry of the divided extract information, as information representative of a mutual relationship between the entries, information indicative of an entry in which the succeeding divisional extract information is recorded, the index file generation means setting, to the entry in which the succeeding divisional extract information is recorded, an identifier indicating that the entry has the succeeding divisional extract information recorded therein.

With the recording apparatus, to the entry of the divided extract information, as information representative of a mutual relationship between the entries, information indicative of an entry in which the succeeding divisional extract information is recorded is set. Further, to the entry in which the succeeding divisional extract information is recorded, an identifier indicating that the entry has the succeeding divisional extract information recorded therein is set. Therefore, for example, where an entry is added through editing or the like and extract information of one file is represented with a plurality of entries, the entry in which succeeding extract information is recorded can be detected simply and rapidly. Consequently, the operability can be further improved than ever.

According to a further aspect of the present invention, there is provided a recording apparatus for recording desired files on a recording medium, including index file generation means for generating an index file of the files recorded on the recording medium in the form of a series of entries each in the form of a block of extract information relating to and coordinated with one of the files, the index file generation means setting, where the files recorded on the recording medium include a plurality of child files generated by dividing one set of contents and a parent file for managing the plural child files, to the entries relating to the child files and the parent file, as information representative of a mutual relationship between the entries, identifiers indicating that the files are the child files and the parent file, respectively.

With the recording apparatus, to the entries relating to the child files and the parent file, as information representative of a mutual relationship between the entries, identifiers indicating that the files are the child files and the parent file are set, respectively. Consequently, for example, where one file is divided, because of a limitation of a file management system or from some other reason, into a plurality of child files to be recorded on a recording medium and one set of contents is represented virtually with the parent file for managing the child files, entries of the parent file and the child files which are associated with each other can be detected simply and rapidly. Consequently, the operability can be further improved than ever.

According to a still further aspect of the present invention, there is provided a recording apparatus for recording desired files on a recording medium, including index file generation means for generating an index file of the files recorded on the recording medium in the form of a series of entries each in the form of a block of extract information relating to and coordinated with one of the files, the index file generation means registering information of file formats of the files into corresponding ones of the entries.

With the recording apparatus, information of file formats of the files is registered into corresponding ones of the entries. Therefore, whether or not each of a large number of files can be reproduced can be detected simply and rapidly by a search of the index file. Consequently, the operability can be further improved than ever.

According to a yet further aspect of the present invention, there is provided a recording apparatus for recording desired files on a recording medium, including index file generation means for generating an index file of the files recorded on the recording medium in the form of a series of entries each in the form of a block of extract information relating to and coordinated with one of the files, the index file generation means registering information regarding decoding of the files into corresponding ones of the entries.

With the recording apparatus, information regarding decoding of the files is registered into corresponding ones of the entries. Therefore, whether or not each of a large number of files can be decoded normally can be detected simply and rapidly by a search of the index file beforehand. Consequently, the operability can be further improved than ever.

According to a yet further aspect of the present invention, there is provided a recording apparatus for recording desired files on a recording medium, including index file generation means for generating an index file of the files recorded on the recording medium in the form of a series of entries each in the form of a block of extract information relating to and coordinated with one of the files, the index file generation means registering information unique to processing means for the files and information for specifying the processing means relating to the unique information.

With the recording apparatus, information unique to processing means for the files and information for specifying the processing means relating to the unique information are registered into the index file. Therefore, information regarding a processing situation, information relating to a source, and so forth can be retained in the index file in accordance with an application program, which may be the processing means, or/and an editing apparatus, a reproduction apparatus, or the like. Consequently, the application program, editing apparatus, reproduction apparatus, or the like can effectively utilize the information retained in the index file to simplify management and processing of a large number of files. Consequently, the operability can be further improved than ever.

According to a yet further aspect of the present invention, there is provided a file management method for managing a plurality of files retained in a predetermined region, including the steps of generating an index file of the plural files in the form of a series of entries each in the form of a block of extract information relating to and coordinated with one of the files, and setting, as information representative of a mutual relationship between the entries, information indicative of a reproduction order of the entries or the files corresponding to the entries to the index file.

According to a yet further aspect of the present invention, there is provided a file management method for managing a plurality of files retained in a predetermined region, including the steps of generating an index file of the plural files in the form of a series of entries each in the form of a block of extract information relating to and coordinated with one of the files, dividing the extract information relating to any of the files to generate the index file which includes a plurality of entries, setting, to the entry of the divided extract information, as information representative of a mutual relationship between the entries, information indicative of an entry in which the succeeding divisional extract information is recorded, and setting, to the entry in which the succeeding divisional extract information is recorded, an identifier indicating that the entry has the succeeding divisional extract information recorded therein.

According to a yet further aspect of the present invention, there is provided a file management method for managing a plurality of files retained in a predetermined region, including the steps of generating an index file of the plural files in the form of a series of entries each in the form of a block of extract information relating to and coordinated with one of the files, and setting, where the files recorded on the recording medium include a plurality of child files generated by dividing one set of contents and a parent file for managing the plural child files, to the entries relating to the child files and the parent file, as information representative of a mutual relationship between the entries, identifiers indicating that the files are the child files and the parent file, respectively.

According to a yet further aspect of the present invention, there is provided a file management method for managing a plurality of files retained in a predetermined region, including the steps of generating an index file of the plural files in the form of a series of entries each in the form of a block of extract information relating to and coordinated with one of the files, and registering information of file formats of the files into corresponding ones of the entries.

According to a yet further aspect of the present invention, there is provided a file management method for managing a plurality of files retained in a predetermined region, including the steps of generating an index file of the plural files in the form of a series of entries each in the form of a block of extract information relating to and coordinated with one of the files, and registering information regarding decoding of the files into corresponding ones of the entries.

According to a yet further aspect of the present invention, there is provided a file management method for managing a plurality of files retained in a predetermined region, including the steps of generating an index file of the plural files in the form of a series of entries each in the form of a block of extract information relating to and coordinated with one of the files, and registering information unique to processing means for the files and information for specifying the processing means relating to the unique information.

With the file management methods, the operability can be further improved than ever.

According to a yet further aspect of the present invention, there is provided a reproduction apparatus for reproducing files recorded on a predetermined recording medium based on a predetermined index file so as to be provided to a user, including, the index file being formed from a series of entries each in the form of a block of extract information relating to and coordinated with one of the files, information indicative of a reproduction order of the entries or the files corresponding to the entries being set, as information representative of a mutual relationship between the entries, to the index file, means for successively reproducing the files recorded on the recording medium in accordance with the reproduction order set to the index file.

According to a yet further aspect of the present invention, there is provided a reproduction apparatus for reproducing files recorded on a predetermined recording medium based on a predetermined index file so as to be provided to a user, including, the index file being formed from a series of entries each in the form of a block of extract information relating to and coordinated with one of the files, the extract information relating to any of the files being divided to generate the index file which includes a plurality of entries, the entry of the divided extract information having set thereto, as information representative of a mutual relationship between the entries, information indicative of an entry in which the succeeding divisional extract information is recorded, the entry in which the succeeding divisional extract information is recorded having set thereto an identifier indicating that the entry has the succeeding divisional extract information recorded therein, means for regenerating the divided extract information based on the information indicative of the entry in which the succeeding divisional extract information is recorded and the identifier indicating that the entry has the succeeding divisional extract information recorded therein.

According to a yet further aspect of the present invention, there is provided a reproduction apparatus for reproducing files recorded on a predetermined recording medium based on a predetermined index file so as to be provided to a user, including, the index file being formed from a series of entries each in the form of a block of extract information relating to and coordinated with one of the files, the entries which relate, where the files recorded on the recording medium include a plurality of child files generated by dividing one set of contents and a parent file for managing the plural child files, to the child files and the parent file having set thereto, as information representative of a mutual relationship between the entries, identifiers indicating that the files are the child files and the parent file, respectively, means for successively reproducing the plural child files based on the identifiers.

According to a yet further aspect of the present invention, there is provided a reproduction apparatus for reproducing files recorded on a predetermined recording medium based on a predetermined index file so as to be provided to a user, including, the index file being formed from a series of entries each in the form of a block of extract information relating to and coordinated with one of the files, information of file formats of the files being registered in corresponding ones of the entries, means for selecting those ones of the files which can be reproduced based on the information of the file formats of the files and displaying a user interface of the selected files.

According to a yet further aspect of the present invention, there is provided a reproduction apparatus for reproducing files recorded on a predetermined recording medium based on a predetermined index file so as to be provided to a user, including, the index file being formed from a series of entries each in the form of a block of extract information relating to and coordinated with one of the files, information regarding decoding of the files being registered in corresponding ones of the entries, means for selecting those ones of the files which can be decoded normally based on the information regarding decoding in the index file and displaying a user interface of the selected files.

According to a yet further aspect of the present invention, there is provided a reproduction apparatus for reproducing files recorded on a predetermined recording medium based on a predetermined index file so as to be provided to a user, including, the index file being formed from a series of entries each in the form of a block of extract information relating to and coordinated with one of the files, information unique to processing means for the files and information for specifying the processing means relating to the unique information being registered in the index file, means for processing the files recorded on the recoding medium based on the unique information relating to the information for specifying the corresponding processing means.

With the reproduction apparatus, the operability can be further improved than ever.

In summary, according to the invention, to an index file, which is formed from a series of entries of extract information from a large number of files, information indicative of a relationship between the files is set. The index file is used to manage a large number of files and so forth recorded on a recording medium. Consequently, the operability can be further improved than ever.

BRIEF DESCRIPTION OF THE DRAWINGS

These and other objects of the invention will be seen by reference to the description, taken in connection with the accompanying drawing, in which;

FIG. 5 is a diagrammatic view illustrating a property track of the index file of FIG. 4;

FIG. 6 is a diagrammatic view illustrating a text track of the index file of FIG. 4;

FIG. 7 is a diagrammatic view illustrating a thumbnail track of the index file of FIG. 4;

FIG. 8 is a diagrammatic view illustrating an intro track of the index file of FIG. 4;

FIG. 9 is a diagrammatic view illustrating actual data of the property;

FIG. 10 is a diagrammatic view illustrating a property entry header illustrated in FIG. 9;

FIG. 13 is a diagrammatic view illustrating a property entry flag;

FIGS. 15A and 15B are diagrammatic views illustrating extension of an entry;

FIGS. 16A and 16B diagrammatic views illustrating division of a file;

FIG. 20 is a diagrammatic view illustrating basic property data;

FIG. 21 is a diagrammatic view illustrating a flag relating to contents;

FIG. 22 is a diagrammatic view illustrating property extension data;

FIG. 23 is a diagrammatic view illustrating a reference file list;

FIG. 24 is a diagrammatic view illustrating a grouping file list;

FIG. 26 is a diagrammatic view illustrating a URL;

FIG. 27 is a diagrammatic view illustrating private property data;

FIG. 28 is a diagrammatic view illustrating a private property entry;

FIG. 31 is a diagrammatic view illustrating a configuration of a file type compatibility atom;

FIG. 32 is a diagrammatic view illustrating a configuration of a profile atom;

FIG. 33 is a diagrammatic view illustrating a configuration of a list of the profile atom of FIG. 32;

FIG. 34 is a diagrammatic view illustrating a type of information relating to decoding;

FIG. 35 is a diagrammatic view illustrating an example of a configuration of a profile atom;

FIG. 40 is a diagrammatic view illustrating reference information of the index file of FIGS. 39A to 39D;

FIG. 41 is a diagrammatic view illustrating part of an index file according to a third embodiment of the present invention; and FIGS. 42A to 42E are diagrammatic views illustrating an index file according to a fourth embodiment of the present invention.

DETAILED DESCRIPTION OF THE PREFERRED EMBODIMENTS

1. First Embodiment

1-1. Configuration of the Optical Disk Apparatus

Figure 1:
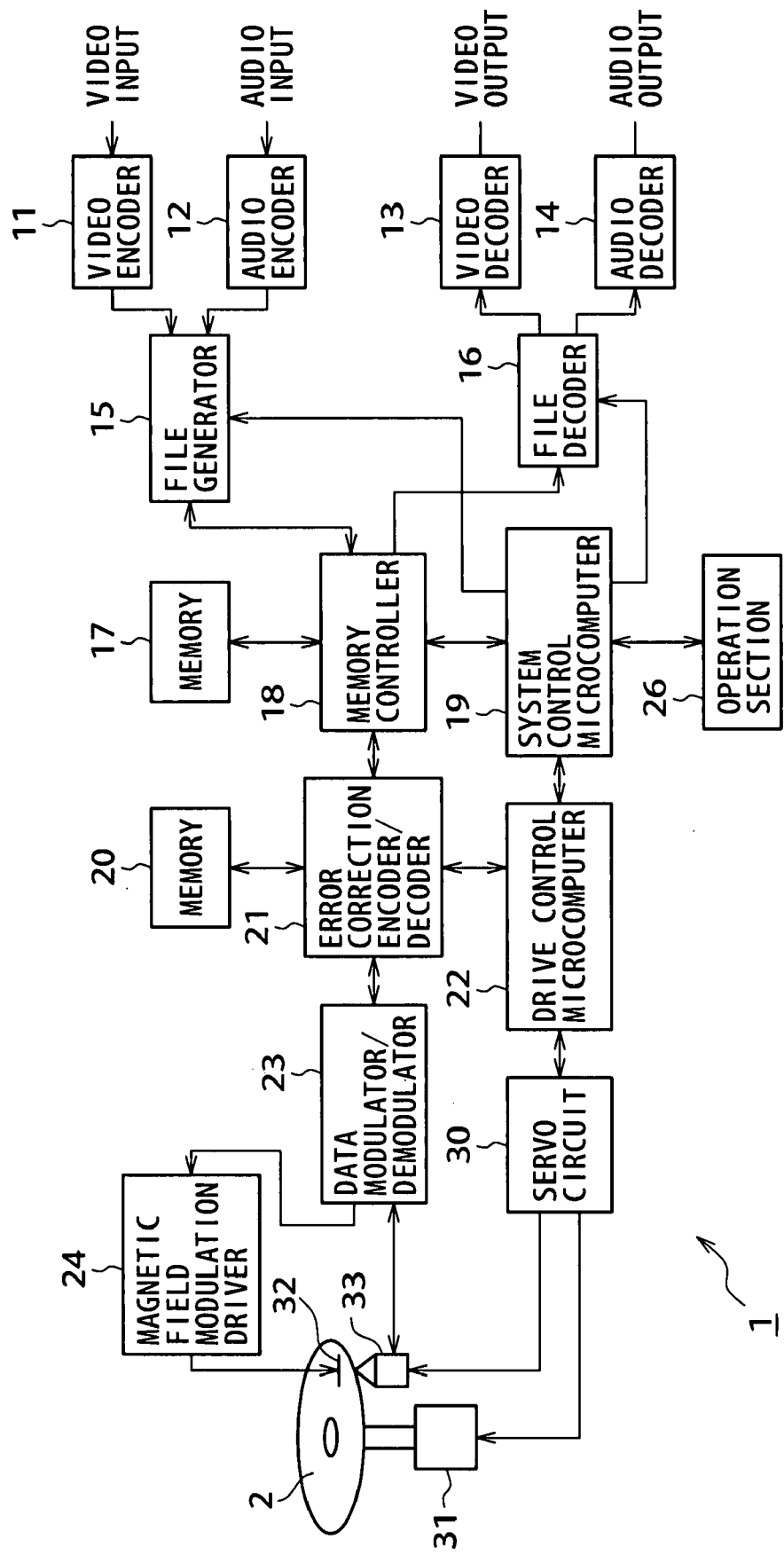
FIG. 1 is a block diagram showing an optical disk apparatus according to a first embodiment of the present invention.

FIG. 1 shows an optical disk apparatus according to a first embodiment of the present invention. The optical disk apparatus 1 acquires a video signal and an audio signal of an image pickup object by means of an image pickup section and a sound acquisition section not shown and records a result of image pickup as the video signal and audio signal on an optical disk 2. Further, the optical disk apparatus 1 reproduces the result of the image pickup recorded on the optical disk 2 and outputs it from a displaying section in the form of a liquid crystal display panel and a sound outputting section in the form of a speaker and further outputs it to an external equipment. The optical disk apparatus 1 converts such a video signal and an audio signal of the image pickup result into streaming data in accordance with a format of the MPEG (Moving Picture Experts Group) and then records the streaming data in accordance with a predetermined file format on the optical disk 2. In the present embodiment, the QuickTime is applied as the predetermined file format just described.

In the optical disk apparatus 1, a video encoder 11 performs an analog/digital conversion process for a video signal of a result of image pickup to generate video data and then encodes the video data in accordance with the format of the MPEG. Consequently, an elementary stream of the video data is outputted from the video encoder 11.

An audio encoder 12 performs an analog/digital conversion process for an audio signal of a result of image pickup to generate audio data and then encodes the audio data in accordance with the format of the MPEG. Consequently, an elementary stream of the audio data is outputted from the audio encoder 12.

A file generator 15 performs, upon recording, a multiplexing process for the elementary streams outputted from the video encoder 11 and the audio encoder 12 and generates a QuickTime movie file under the control of a system controlling microcomputer 19.

A memory controller 18 changes over operation thereof under the control of the system controlling microcomputer 19. Upon recording, the memory controller 18 successively records and temporarily retains a data string of a QuickTime movie file outputted from the file generator 15 and various data outputted from the system controlling microcomputer 19 into a memory 17 and then outputs the retained data so as to be processed by a succeeding error correction encoder/decoder 21. On the other hand, upon reproducing, the memory controller 18 temporarily retains output data from the error correction encoder/decoder 21 and outputs the retained data to a file decoder 16 and the system controlling microcomputer 19.

The error correction encoder/decoder 21 changes over operation thereof under the control of the system controlling microcomputer 19, and upon recording, temporarily records output data from the memory controller 18 into a memory 20 and adds an error correction code to the temporarily recorded data. Further, the error correction encoder/decoder 21 reads out and outputs the data retained in the memory 20 in such a manner as just described in accordance with a predetermined order. Thereupon, the data are interleaved, and the interleaved data are outputted to a data modulator/demodulator 23. On the other hand, upon reproduction, the error correction encoder/decoder 21 temporarily records data outputted from the data modulator/demodulator 23 into the memory 20 in accordance with a predetermined order and then outputs the data conversely to those upon recording. Thereupon, the error correction encoder/decoder 21 performs a deinterleave process for the data outputted from the data modulator/demodulator 23 and outputs the interleaved data to the memory controller 18. Further, at this time, the error correction encoder/decoder 21 performs an error correction process with the error correction code added upon recording.

The data modulator/demodulator 23 changes over operation thereof under the control of the system controlling microcomputer 19. Upon recording, the data modulator/demodulator 23 converts output data from the error correction encoder/decoder 21 into a serial data string and then performs a modulation process for the serial data string and outputs the modulated serial data string to a magnetic field modulation driver 24 or an optical pickup 33. On the other hand, upon reproduction, the data modulator/demodulator 23 reproduces a clock from a reproduction signal outputted from the optical pickup 33 and performs a binary identification process and a demodulation process for the reproduction signal with reference to the clock. Consequently, the data modulator/demodulator 23 acquires reproduction data corresponding to the serial data string generated upon recording and outputs the reproduction data to the error correction encoder/decoder 21.

Where a magneto-optical disk is used as the optical disk 2, upon recording, the magnetic modulation driver 24 drives a magnetic field head 32 with an output signal of the data modulator/demodulator 23 under the control of the system controlling microcomputer 19. Here, the magnetic field head 32 is held so as to face the optical pickup 33 with the optical disk 2 interposed therebetween and applies a modulation magnetic field based on the output data from the data modulator/demodulator 23 to an irradiation position of a laser beam of the optical pickup 33. Consequently, in the optical disk apparatus 1, where a magneto-optical disk is used as the optical disk 2, a QuickTime movie file and so forth are recorded on the optical disk 2 using a thermomagnetic recording method.

The optical disk 2 is a disk type recording medium. In the present embodiment, as the optical disk 2, a rewritable optical disk such as a magneto-optical disk (MO), a phase change type disk, or the like is used. A spindle motor 31 drives the optical disk 2 to rotate in accordance with a condition such as a constant linear velocity (CLV), a constant angular velocity (CAV), a zone constant linear velocity, or the like suitable for the optical disk 2 under the control of a servo circuit 30.

The servo circuit 30 controls operation of the spindle motor 31 based on various signals outputted from the optical pickup 33 to perform a spindle controlling process. Further, the servo circuit 30 similarly controls the optical pickup 33 to perform a tracking control and a focusing control process, further causes the optical pickup 33 and the magnetic field head 32 to perform seeking operation, and executes a process such as a focus searching process.

A drive controlling microcomputer 22 controls operation of seeking and so forth of the servo circuit 30 in accordance with an instruction of the system controlling microcomputer 19.

The optical pickup 33 irradiates a laser beam upon the optical disk 2, receives the reflected light by means of a predetermined light reception element, and then arithmetically operates a result of the light reception to generate various controlling signals. The optical pickup 33 outputs the controlling signals and further outputs a reproduction signal whose signal level varies in response to a pit string or a mark string formed on the optical disk 2. Further, the optical pickup 33 changes over operation thereof under the control of the system controlling microcomputer 19, and where the optical disk 2 is a magneto-optical disk, upon recording, the optical pickup 33 intermittently raises the luminous energy of the laser beam to be irradiated upon the optical disk 2. Consequently, in the optical disk apparatus 1, a QuickTime movie file or a like file is recorded onto the optical disk 2 by a pulse train method. On the other hand, where the optical disk 2 is a phase change type disk or the like, the optical pickup 33 raises the luminous energy of the laser beam to be irradiated upon the optical disk 2 from that upon reproduction to that upon writing. Consequently, a QuickTime movie file or the like is recorded on the optical disk 2 by applying a thermal recording method.

The optical disk apparatus 1 compresses a video signal and an audio signal of a result of image pickup by means of the video encoder 11 and the audio encoder 12 to individually convert them into elementary streams and then converts the elementary streams into a QuickTime movie file by means of the file generator 15. Data of the QuickTime movie file is sent successively through the memory controller 18, error correction encoder/decoder 21, and data modulator/demodulator 23 to the optical pickup 33. The data of the QuickTime movie file is recorded on the optical disk 2 by the optical pickup 33 or by the optical pickup 33 and the magnetic field head 32 together with data of an index file and so forth. The index file is a file for indexing in which QuickTime movie files recorded on the optical disk 2 are recorded as object files for management.

Further, the optical disk apparatus 1 processes a reproduction signal obtained by the optical pickup 33 by means of the data modulator/demodulator 23 to obtain reproduction data and then processes the reproduction data by means of the error correction encoder/decoder 21. Consequently, a QuickTime movie file, the index file, and so forth recorded on the optical disk 2 can be reproduced, and the reproduced QuickTime movie file, index file, and so forth are outputted from the memory controller 18.

The file decoder 16 receives data of the QuickTime movie file outputted from the memory controller 18, decomposes the data into elementary streams of video data and audio data, and outputs the elementary streams. A video decoder 13 decompresses the elementary stream of the video data and outputs the decompressed elementary stream to a display apparatus or external equipment not shown. An audio decoder 14 decomposes the elementary stream of the audio data outputted from the file decoder 16 and outputs the decompressed elementary stream to a sound outputting apparatus or external equipment not shown. Consequently, in the optical disk apparatus 1, a result of image pickup reproduced from the optical disk 2 can be monitored.

It is to be noted that the optical disk apparatus 1 includes an interface for allowing connection of an external apparatus such as a computer thereto. Consequently, the optical disk apparatus 1 can record output of the external apparatus in place of data of an image pickup result on the optical disk 2 and reproduce a file recorded on the optical disk 2 so that the file can be processed by the external apparatus.

An operation section 26 includes various operation elements of the optical disk apparatus 1 and a touch panel disposed on a liquid crystal display panel, and issues a notification of various operations by the user to the system controlling microcomputer 19.

The system controlling microcomputer 19 controls operation of the entire optical disk apparatus 1. If loading of the optical disk 2 is detected through execution of a predetermined processing procedure recorded in a memory not shown, then the system controlling microcomputer 19 causes the optical pickup 33 to perform seeking operation to the innermost circumference of the optical disk 2 and reproduce management information of a file managing system regarding the optical disk 2. Further, the system controlling microcomputer 19 acquires the reproduced management information from the memory controller 18 and stores it into a built-in memory. Consequently, the system controlling microcomputer 19 detects an address each file recorded on the optical disk 2 and a free region of the optical disk 2.

If the system controlling microcomputer 19 searches the management information acquired in this manner and detects that an index file is recorded on the optical disk 2, then it controls the optical pickup 33 to perform seeking operation to the recorded position of the index file and reproduce the index file. Then, the system controlling microcomputer 19 acquires the reproduced index file from the memory controller 18 and records and retains it into and in the built-in memory. Consequently, in the present embodiment, the overall operability is improved in processing of files recorded on the optical disk 2 through utilization of the index file. It is to be noted that the index file can be recorded on the innermost circumference side of a user area of the optical disk 2 to reduce the built-up time.

The system controlling microcomputer 19 controls operation of the entire optical disk apparatus 1 using the index file in response to an operation of the user. In particular, the system controlling microcomputer 19 causes thumbnail images and so forth to be displayed on a liquid crystal display panel for monitoring based on the index file to introduce contents of QuickTime movie files recorded on the optical disk 2. Then, the system controlling microcomputer 19 accepts selection of a file by the user from among the introduced QuickTime movie files and causes the file selected by the user to be reproduced based on corresponding management information.

On the other hand, if an instruction to record an image pickup result is issued by the user, then the system controlling microcomputer 19 detects a free region in accordance with the management information and causes the optical pickup 33 to perform seeking operation to the free region and records successively obtained image pickup results onto the optical disk 2. Further, the system controlling microcomputer 19 updates the management information retained in the memory so as to correspond to records of QuickTime movie files by such recording of the image pickup results. Then, upon ejection of the optical disk 2 or the like, the system controlling microcomputer 19 updates the management information of the optical disk 2 in accordance with the updated management information. It is to be noted that the updating of the management information is executed by outputting the management information retained and updated in the memory to the error correction encoder/decoder 21 through the memory controller 18.

In the processes described above, the system controlling microcomputer 19 outputs various kinds of information necessary for generating a QuickTime file to be used for recording to the file generator 15. Further, the system controlling microcomputer 19 acquires information necessary generating an index file through the file generator 15. The system controlling microcomputer 19 uses the thus acquired information, information outputted to the file generator 15, and other necessary information to update the index file retained in the memory regarding a QuickTime movie file to be recorded newly on the optical disk 2. Then, the system controlling microcomputer 19 updates the index file recorded on the optical disk 2 with the updates index file retained in the memory in a similar manner as in the updating process of management information.

On the other hand, if an instruction to edit a file recorded on the optical disk 2 is issued by the user, then the system controlling microcomputer 19 updates the index file and the management information retained in the memory in a similar manner as upon recording so as to cope with processing in the editing. Then, the system controlling microcomputer 19 updates the index file and the management information of the optical disk 2 with the index file and the management information retained in the memory. It is to be noted that, if the index file is not recorded although QuickTime movie files are recorded on the optical disk 2, the system controlling microcomputer 19 generates an index file in accordance with an instruction of the user. Then, the system controlling microcomputer 19 stores the index file into the memory and records the index file on the optical disk 2. In this process, the system controlling microcomputer 19 reproduces pertaining portions of QuickTime movie files from the optical disk 2 to acquire information necessary for generating an index file from the memory controller 18.

Thus, in the present embodiment, the system controlling microcomputer 19 serves as an index file generation means for generating an index file together with the file generator 15.

1-2. Index File

The index file is used to manage information necessary for reproduction by a file management system of the optical disk 2 such as an address of a recorded position, a file name, and a file length similarly to various files recorded on the optical disk 2 such as a QuickTime movie file. The index file includes information for introduction of contents of QuickTime movie files of an object of management recorded on the optical disk 2. If a QuickTime movie file recorded on the optical disk 2 is selected with reference to the index file, then the optical disk apparatus 1 reproduces the selected file from the optical disk 2 based on the file management system. Consequently, even where a large number of QuickTime files are recorded on the optical disk 2, the optical disk apparatus 1 can select a desired file rapidly and accurately, and therefore, the operability can be improved as much.

In the present embodiment, the index file is formed from a series of entries each in the form of a block of information (hereinafter referred to as extract information) extracted from information relating to QuickTime movie files and other necessary information, which are allocated to information introducing contents of the QuickTime movie files and so forth. Therefore, the contents of the QuickTime movie files can be grasped simply and readily from the index file.

The index file has a file structure same as that of a QuickTime movie file and includes an index data atom, which is a set of data of extract information, and an index atom, which is a set of management data for managing the data set. Thus, the index file can be generated and processed using the file generator 15, which is a tool for generating a QuickTime movie file, and therefore, the optical disk apparatus 1 is simplified in configuration as much.

Figure 2:
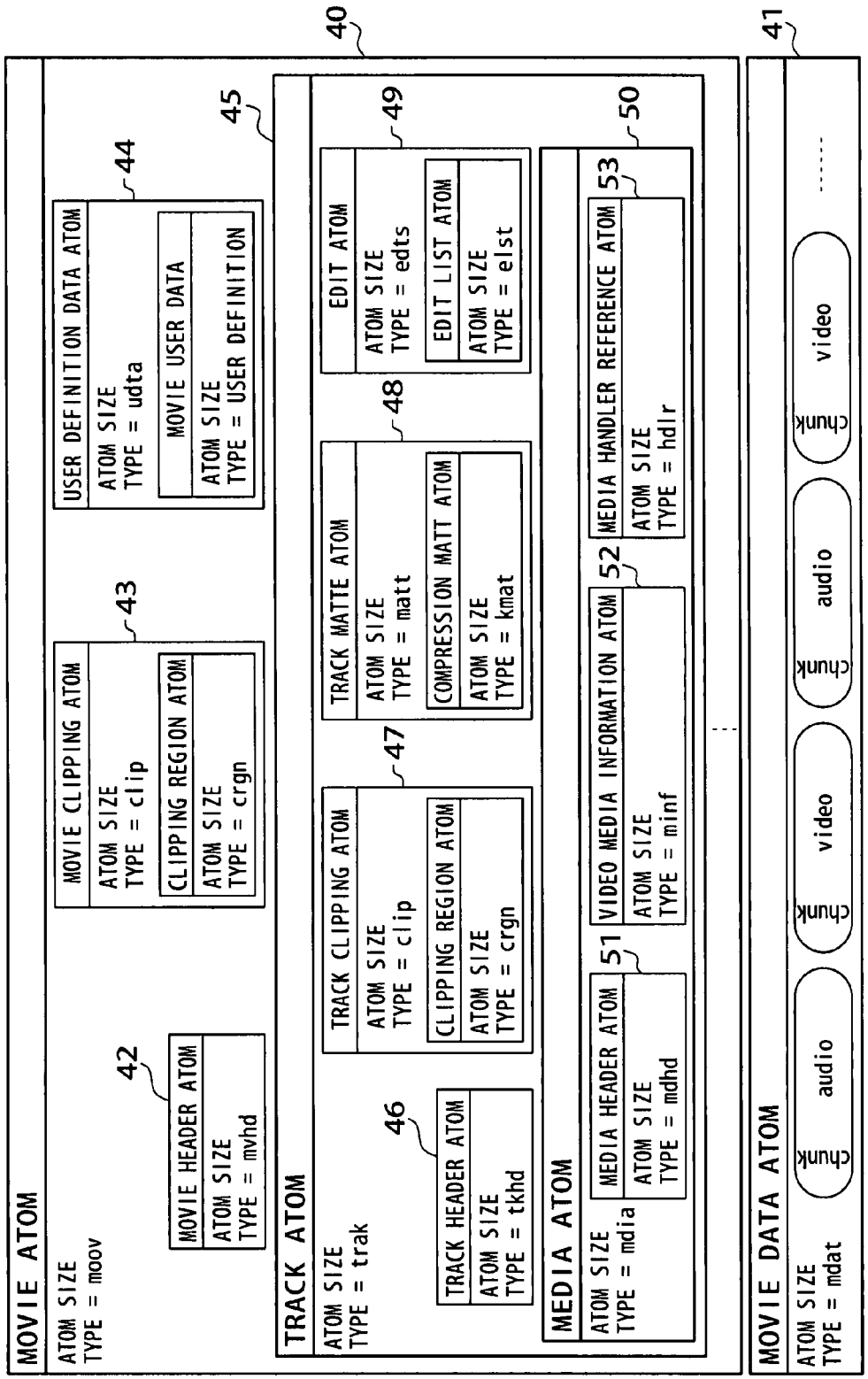
FIG. 2 is a diagrammatic view illustrating an example of a configuration of a QT movie file.

FIG. 2 illustrates an example of a configuration of a QuickTime movie file. It is to be noted that the QuickTime is disclosed in "INSIDE MACINTOSH: QuickTime (Japanese version) (Addison Wesley)" and so forth. A QuickTime movie file is formed using a data unit called atom as a reference, and each atom is formed from a size, type information, and information allocated to the atom.

The QuickTime movie file is formed from a movie atom 40 and a movie data atom 41. The movie data atom 41 is a data unit to which elementary streams of video data and audio data, which are actual data of the QuickTime movie file, are allocated. In the QuickTime movie file, a minimum unit of actual data is handled as a sample, and a chunk is defined as a set of samples. To the movie data atom 41, chunks from an elementary stream of video data and chunks from an elementary stream of audio data are successively allocated, and further, information representative of the size and the type is allocated.

To the movie atom 40, information necessary for reproduction of the movie data atom 41 and other necessary information are allocated in a hierarchical structure. In particular, the movie atom 40 is defined by a movie header atom 42, a movie clipping atom 43, a user definition data atom 44, one or more track atoms 45, and so forth. The movie header atom 42 accommodates information relating to the entire QuickTime movie file. The movie clipping atom 43 designates a clipping region.

Each of the track atoms 45 is provided for one track in the QuickTime movie file and includes a track header atom 46, a track clipping atom 47, a track matte atom 48, an edit atom 49, and a media atom 50. The track atom 45 describes information relating to individual data in the movie data atom 41. It is to be noted that only one track atom 45 for a video movie is illustrated while the other track atoms are omitted.

The media atom 50 from among the atoms forming the track atom 45 is formed from a media header atom 51, a video media information atom 52, and a media handler reference atom 53, and data of a movie track, information for defining a component for interpretation of media data, and so forth are allocated to the media atom 50. It is to be noted that a media handler by the media handler reference atom can use the information atom of the video media information atom 52 to perform mapping from media time to media data.

Figure 3:
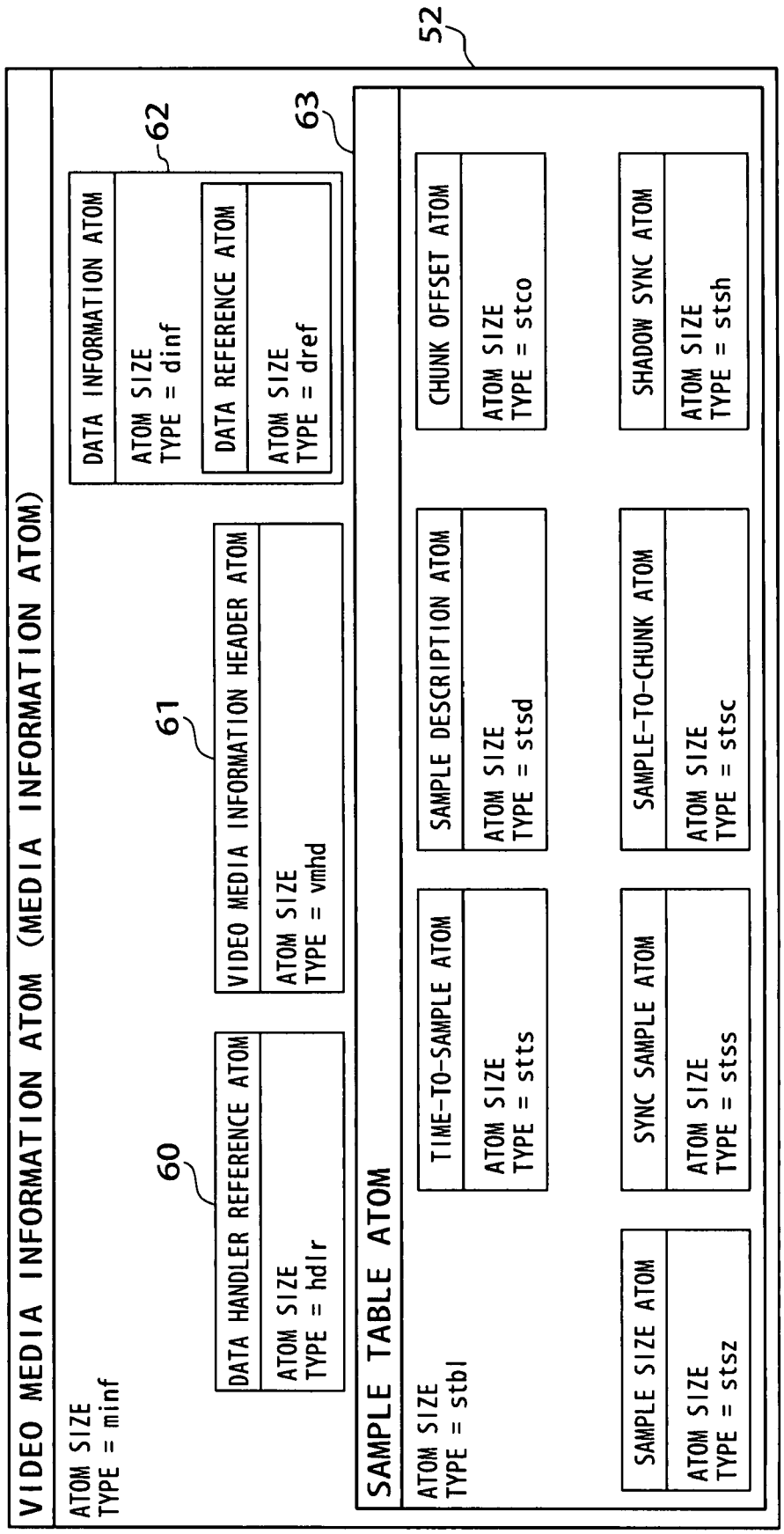
FIG. 3 is a diagrammatic view illustrating a video media information atom illustrated in FIG. 2.

Referring to FIG. 3, the video media information atom 52 is formed from a data handler reference atom 60, a media information header atom 61, a data information atom 62, and a sample table atom 63 and describes information relating to media.

In particular, the data handler reference atom 60 describes information relating to handling of media data and includes information for designating a data handler component for providing accessing means to the media data. The data information atom 62 includes a data reference atom and describes information relating to the data.

To the sample table atom 63, information necessary to convert media time into a sample number representative of a sample position is allocated in the form of a table. The sample table atom 63 includes a sample size atom, a time-to-sample atom, a sync sample atom, a sample description atom, a sample-to-chunk atom, a chunk offset atom, a shadow sync atom, and so forth.

The sample size atom among the atoms mentioned above describes the size of a sample, and the time-to-sample atom describes time information of recorded data in the form of a relationship between a sample and the time axis. The sync sample atom describes information relating to synchronism and designates a key frame in a media. It is to be noted that the key frame is a frame of a self-contained type, which does not rely upon any preceding frame. The sample description atom retains information relating to decoding of samples in a media. It is to be noted that the media can have one or a plurality of sample description atoms in accordance with the compression type used in the media.

The sample-to-chunk atom is used to refer to a table in the sample description atom to identify a sample description corresponding to each of samples in the media. The sample-to-chunk atom describes a relationship between samples and chunks such that a sample position in the media can be discriminated based on information of the top chunk, the number of samples per one chunk, and a sample description-ID. The chunk offset atom describes the start bit position of a chunk in the movie data and defines the position of each chunk in the data stream.

With the QuickTime movie file having such a configuration as described above, if a sample table is expanded in a memory based on the atoms in the sample table atom 63, then a relationship between data in the movie data atom 41 can be identified from the sample table. Consequently, it is possible to successively trace the hierarchies of the movie atom 40 to detect the atoms in the sample table atom 63 and reproduce the data in the movie data atom 41 in synchronism along the time axis.

It is to be noted that, while, in the present embodiment, elementary streams of compressed video data and audio data are allocated to the movie data atom 41, such data in a Quick-Time movie file need not necessarily be allocated in a compression coded form, but may be stored otherwise in the form of linear data. Further, for example, text data, actual data of a MIDI file or the like may be allocated to the movie data atom 41. In this instance, text tracks, MIDI tracks and so forth are provided in the movie atom 40 in conformity with the configuration of the movie data atom 41.

Figure 4:
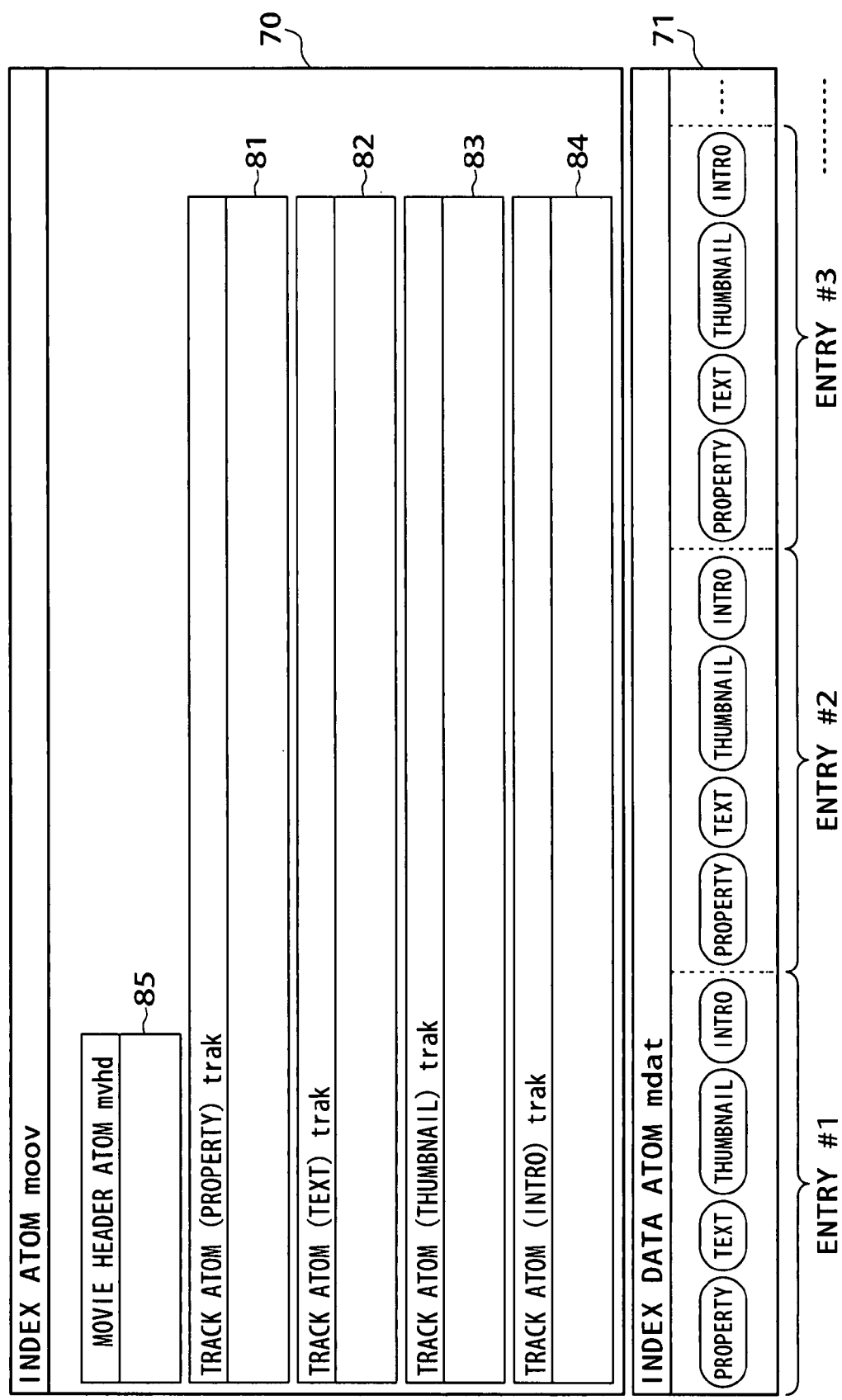
FIG. 4 is a diagrammatic view illustrating an index file.
Figures 11A, 11B:
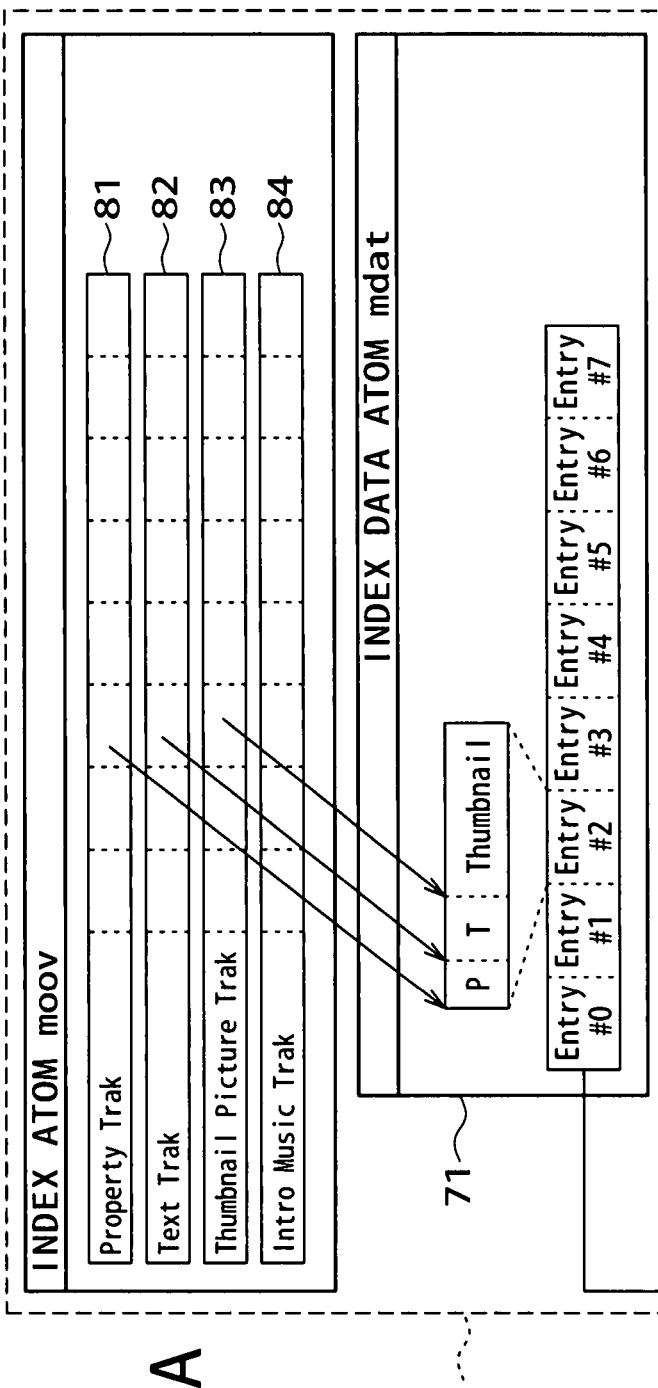
FIGS. 11A and 11B are diagrammatic views illustrating a structure of the index file.

The index file is configured in such a manner as illustrated in FIG. 4 in conformity with such a configuration of a Quick-Time movie file as described above. In particular, the index file is formed from an index atom 70 and an index data atom 71 corresponding to the movie atom 40 and the movie data atom 41 of the QuickTime movie file, respectively. The index data atom 71 includes actual data of a disk title, actual data of extract information of the files, and forth allocated as chunks thereto. Meanwhile, management information of the actual data allocated to the index data atom 71 is allocated to the index atom 70.

The extract information is information extracted partly from manage object files, which introduce contents of the management files in the index file. Therefore, although the extract information varies depending upon the types of the management object files, where the management object files are QuickTime movie files of video data and audio data as in the present embodiment, three kinds of data, that is, text data, thumbnail picture data, and intro data corresponding to property data are applied to the extract data.

The index data atom 71 manages extract information of each management object file with an entry, which includes three kinds of data, that is, text data, thumbnail picture data, and intro data, in combination with respect to a property corresponding to the management object file. It is to be noted that, in the top entry #1, extract information of the disk title is allocated in place of a management object file. Further, in the index data atom 71, property data, text data, thumbnail data, and intro data are set to chunks and allocated thereto.

The property data represents a property of the disk title or a management object file, and extract information in the form of binary data set to the disk title or a management object file is allocated together with management information of the entry. It is to be noted that the property data is provided without fail even where the succeeding text, thumbnail picture, and intro data are not provided because the type of the management object file is different.

The text data includes data representative of a character string of the disk title or the title of a management object file.

The thumbnail picture data includes data of a still picture representative of the disk title or a management object file, and, for example, the top picture of a management object file is allocated to the thumbnail picture of the management object file. In contrast, to the thumbnail picture of the disk title, a thumbnail picture, for example of a specific entry of a management object file is allocated in accordance with selection of the user. It is to be noted that the thumbnail picture of each management object file may otherwise be set by selection of the user.

The intro data is audio data for a short period of time representative of contents of a management object file. To the intro data of a management object file, audio data for several seconds, typically for 5 seconds, for example, after reproduction of a corresponding file is started is allocated. In contrast, to the intro data of the disk title, intro data of a specific entry of, for example, each management object file is allocated by selection of the user. It is to be noted that also the intro data of a management object file may otherwise be set by selection of the user.

Thus, in the optical disk apparatus 1, the system controlling microcomputer 19 acquires and decodes video data and audio data compressed by the file generator 15 and generates a thumbnail picture from the video data through sampling of pixels of the video data. Meanwhile, with regard to the audio data, a required portion of it is cut out to generate intro data. Further, the system controlling microcomputer 19 generates title data from file information of each management object file stored in the file management system of the optical disk 2 in accordance with setting of the user. In contrast, the property data is generated by the system controlling microcomputer 19 in response to an operation of the user. It is to be noted that such thumbnail picture and intro data are compressed and allocated to the index data atom as occasion demands.

The index atom 70 includes track atoms 81, 82, 83, and 84 corresponding to the property, text, thumbnail picture, and intro data of the index data atom 71, and a movie header atom 85, which supervises the tracks 81, 82, 83, and 84. The track atoms 81, 82, 83, and 84 are hereinafter referred to as property track, text track, thumbnail track, and intro track, respectively. It is to be noted that, since only the property data is essentially required in the index data atom 71, only the movie header atom and the property track are essentially required in the index atom 70.

To the movie header atom 85, information relating to the entire index file is allocated similarly as in the case of a QuickTime movie file. In contrast, to each of the property track 81, text track 82, thumbnail track 83, and intro track 84, position information of corresponding actual data is allocated in order of entries in the form of a table.

FIGS. 5 to 8 illustrate the property track 81, text track 82, thumbnail track 83, and intro track 84, respectively. To each of them, relative positions (RBP: Relative Byte Number) of start bytes and data lengths of corresponding chunks are allocated. Consequently, when the optical disk apparatus 1 performs a search for a desired file with reference to a thumbnail picture, for example, in accordance with an instruction of the user, it can acquire a corresponding chunk from the index data atom 71 based on the thumbnail track 83 to successively acquire data of thumbnail pictures. Further, the optical disk apparatus 1 can detect a chunk of a corresponding property from the thumbnail track 81 and process data of a thumbnail picture acquired in this manner and so forth.

1-3. Property

FIG. 9 illustrates actual data of the property set to each chunk. The property is formed from a Property Entry Header, Basic Property Data, and Property Extension Data. To the property entry header, attribute information of property information, which is necessary to manage management object files in a hierarchical structure, is allocated, and to the basic property data, basic extract information relating to the property is allocated. While each of the property entry header and the basic property data is formed with a fixed length, the property extension data is set with a variable length and is used for an option of the property entry header or the like.

Referring to FIG. 10, the property entry header is formed from an Entry Number, a Parent Entry Number, Popery Entry Flags, a Play-order, an Entry Data Size, a Next-extends-entry, and the Reserved.

The entry number is identification data of an entry, and a unique code is allocated to each entry and may be, for example, a number which increments from the value 0 in order of entry. It is to be noted that, where the entry number is defined as an order number in the order of entry, the entry number field can be omitted.

The parent entry number is formed from an entry number of an entry to which some other entries belong. Consequently, regarding a QuickTime movie file corresponding to each entry, a folder to which a QuickTime movie file belongs can be specified in a file management system regarding an optical disk 2 on which QuickTime movie files are recorded or in a virtual file structure set by the user as seen in FIGS. 11A, 11B, 12A and 12B. In particular, in FIGS. 11A to 12B, it is illustrated that several QuickTime movie files according to the file management system of the optical disk 2 are managed with the index file. More particularly, a folder and QuickTime movie files having the entry numbers 1, 2 and 3 belong to another folder having the entry number 0 (which is a root folder in the example). Further, a folder and a QuickTime movie file having the entry numbers 4 and 5 belongs to the folder having the entry number 3. Furthermore, QuickTime movie files having the entry numbers 6 and 7 belong to the folder having the entry number 4.

It is to be noted that, in the example illustrated in FIGS. 11A to 12B, the parent entry number with respect to the entry whose entry number is 0 and represents that it is the root folder is set to a code (represented by reference character x), which has no meaning. Further, File-a to File-e indicate the file names of corresponding QuickTime movie files.

To the property entry flags, attributes of the entry are set. In particular, as seen in FIG. 13, the 0th bit of the property entry flags is used as a flag, which indicates whether the entry is Original or Favorite. The favorite here is a group of entries selected from among entries provided in the index file based on setting of the user. In the present embodiment, a desired file of the user can be managed in a virtual hierarchical structure based on the group.

The first bit of the property entry flags is allocated to a flag for identification of whether the entry is an entry (File) of a file or an entry (Folder) of a folder, which collectively includes some other entries. Thus, in the example described hereinabove with reference to FIGS. 11A, 11B, 12A and 12B, the 0th bit (represented by PE-Flags (0)) of the property entry flags is set to the value 0 in all of the entries having the entry numbers 0 to 7. Therefore, it can be seen that the hierarchical structure indicated by the entry numbers and the parent entry numbers is an original hierarchical structure of files managed by the file management system relating to the optical disk 2. Also it can be seen from the first bit (represented by PE-Flags (1)) of the property entry flags that the entries having the entry numbers 1, 2, 5, 6 and 7 are entries of original data each in the form of a QuickTime movie file.

Figures 12A, 12B:
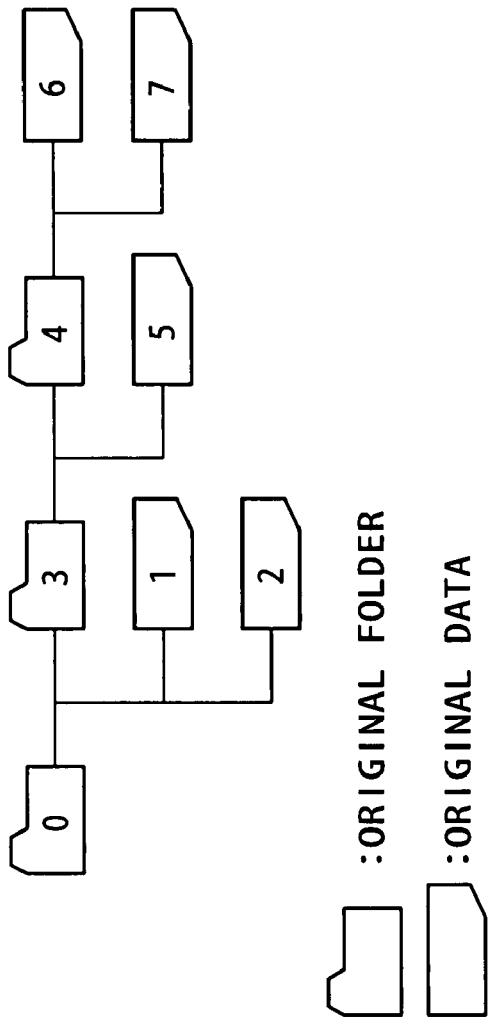
FIGS. 12A and 12B are diagrammatic views illustrating a relationship between the index file and a file management system.
Figures 14A, 14B:
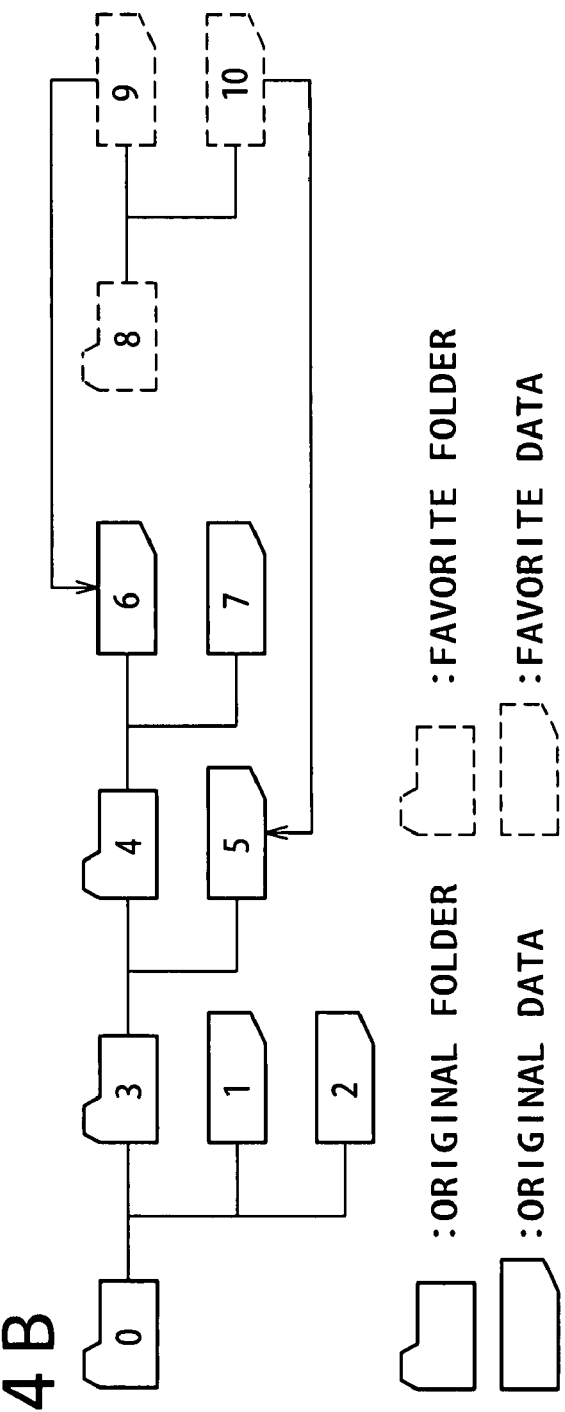
FIGS. 14A and 14B diagrammatic views illustrating a virtual file structure.

As can be seen from the contrast of FIGS. 14A and 14B with FIGS. 12A and 12B, the 0th bit (represented by PE-Flags (0)) of the property entry flags in the QuickTime movie files (File-d and File-c) having the entry numbers 6 and 5 is set to the value 1 and entries (entry numbers 9 and 10) of the property according to the favorite are added. Further, a folder according to the favorite, which collectively includes the added entries, is placed into a different entry (entry number 8). Consequently, a file management system having a virtual hierarchical structure according to the favorite can be constructed. It is to be noted that, in FIGS. 14A and 14B, the first bit of the property entry flags in the entry (entry number 8) of the folder according to the favorite is set to the value 1, and the parent entry numbers in the entries of the entry numbers 9 and 10 following the entry of the entry number 8 indicate the entry number 8 of the folder. Consequently, in the display of the file structure according to the favorite, the folder of the entry number 8 is set to a root folder, and the QuickTime movie files of the entry numbers 9 and 10 are virtually disposed in a lower hierarchy with respect to the root folder. Consequently, the system controlling microcomputer 19 sets the property entry flags through an editing process by the user for the files recorded on the optical disk 2.

The second bit of the property entry flags (FIG. 13) is set to a flag (Extends) representing that the region is an extension region of the entry. Referring to FIGS. 15A and 15B, in the present embodiment, each chain has a fixed data length including a predetermined amount of data so that a process by the system controlling microcomputer 19 or the like can be simplified. Further, where each chain is formed so as to have a fixed data length in this manner, if the data length of a chain is short, then an entry can be added so that extract information of one QuickTime movie file can be represented with a plurality of entries (chains). Therefore, even if the data amount of thumbnail picture data or the like exceeds the data amount set to one chain as a result of editing or the like, this can be coped with by the present embodiment. The extension region of an entry signifies that it is a region, which relates to such an additional entry, and in the example illustrated in FIGS. 15A and 15B, the entry of the entry number 8 is set as an extension region to the entry of the entry number 2. Thus, the system controlling microcomputer 19 supervises the data amount of the property, thumbnail picture and so forth to be allocated to each chain and suitably sets an entry as an extension region, and places, for the property of the entry relating to the extension region, the value 1 into the flag (Extends) which indicates an extension region of the entry.

The third bit of the property entry flags (FIG. 13) is set to the reserved, and the fourth bit is set to a flag (Valid), which represents whether the entry is valid or invalid. Consequently, in the present embodiment, for example, when one QuickTime movie file is deleted, the index file can be updated only by merely changing over the setting of the flag (Valid) of the fourth bit in accordance with the deletion of the file.

The fifth to seventh bits of the property entry flags (FIG. 13) are set to the reserved, and the eighth bit is set to a flag (Reference) representing that the file registered in the entry refers to another file. Further, the ninth bit is set to a flag (Child File) representing that the file registered in the entry is a divided child file, and the tenth bit is set to a flag (Parent File) representing that the file registered in the entry is a parent file of the divided child file. In particular, in the file management system applied to the optical disk 2 or the like, it is necessary to set the data length of one file to a value lower than a predetermined upper limit value. However, the data amount of streaming contents based on a QuickTime movie file or the like sometimes exceeds the upper limit value by the file management system. Therefore, according to the QuickTime, a file having such an excessively great data amount is divided intermediately, and files obtained by the division are managed with a management file. Consequently, also a file, which exceeds the limit by the file management system, can be recorded.

In the present embodiment, since such a management file as just described refers to a plurality of files obtained by division, a flag (Reference), which indicates such reference, is set to the entry of the management file. Further, the flags (Parent File and Child File) representative of a parent file and a child file are set to the entries of the management file and the divisional files, respectively. In other words, where files to be recorded on the optical disk 2 as a recording medium are a plurality of child files generated by dividing one set of contents and a parent file which manages the child files, identifiers (Parent File and Child File) representing that the child files and the parent file are entries of child files and a parent file, respectively, are set to the child files and the parent file as information representing a mutual relationship among the entries.

Consequently, it can be seen in an example of FIGS. 16A and 16B that files corresponding to entries of the entry numbers 2 and 3 are files obtained by division in this manner and the management file for the files corresponding to the entries of the entry numbers 2 and 3 is registered with the entry number 1. Similarly, it can be seen that files corresponding to entries of the entry numbers 5 and 6 are files obtained by division in such a manner as described above and the management file for the files corresponding to the entries of the entry numbers 5 and 6 is registered with the entry number 4.

It is to be noted that, according to such a reference relationship as just described, for example, if an editing process is performed, then a file of a source of editing is sometimes referred to by a plurality of files by different editing processes, and in such an instance, a single child file is referred to by a plurality of parent files.

Consequently, in the present embodiment, a relationship of a parent file, a child file and a reference file can be grasped readily from the index file. Further, if contents spanning successive records have a data amount exceeding a predetermined data amount, the system controlling microcomputer 19 divides the contents and sets a management file, and then registers the files obtained by the division and the management file as entries into index data and sets flags for them. Further, the system controlling microcomputer 19 determines, in response to an operation of the user, for example, the child files among the files as hidden files so that they may not be displayed. Further, if the parent file is designated by the user, then the system controlling microcomputer 19 successively reproduces the child files as reference files of the parent file in accordance with the settings of the flags.

The 11th to 13th bits of the property entry flags (FIG. 13) are set to flags representative of whether or not the title, thumbnail picture and intro entries corresponding to the property entry have an extension region, respectively. As can be seen from the contrast of FIGS. 17A and 17B with FIGS. 15A and 15B, in the present embodiment, an extension region to the entry of the entry number 2 is set as the entry of the entry number 8, and if data required for the setting of the extension region is data of the title, then the 11th bit of the property entry flags is set to the value 1 so as to represent that the entry of the title has an extension region. Consequently, in the present embodiment, it is possible to search the flags of the 11th to 13th bits based on the settings of the flag (Extends) of the third bit to rapidly search out data relating to an extension region. Consequently, where the flag (Extends) of the third bit is set in accordance with an editing process or the like by the user, the system controlling microcomputer 19 suitably sets the three flags and searches the index data in accordance with the settings of the flags.

The 14th and 15th bits of the property entry flags are set to the reserved.

The property entry header (FIG. 10) includes, next to the property entry flags described above, the Play-order to which information representative of a reproduction order of entries or files corresponding to the entries is set as information representative of a mutual relationship between the entries. Consequently, in the example illustrated in FIGS. 14A and 14B, if the user designates reproduction by the original file management system, then the title, thumbnail picture, intro entries of the entry numbers 1, 2, 5, 6 and 7 according to the original files are reproduced in the set order in the Play-order, and further, the corresponding QuickTime movie files can be reproduced in the order set in the Play-order. In the example illustrated in FIGS. 14A and 14B, data acquired from corresponding tracks (82 to 84) are sorted and reproduced in the order of the entry numbers 1, 5, 7, 6 and 2.

On the other hand, if the user selects reproduction according to the favorite, then the files of the entry numbers 9 and 10 in the group according to the favorite can be reproduced in the order set in the Play-order, and then corresponding QuickTime movie files can be reproduced in the order set in the Play-order. It is to be noted that, in this instance, where one of the entries is a folder, then since an object of reproduction does not exist actually in the entry, the Play-order in the present embodiment is set with a code (indicated by a mark x), which has no meaning.

Figure 18A:
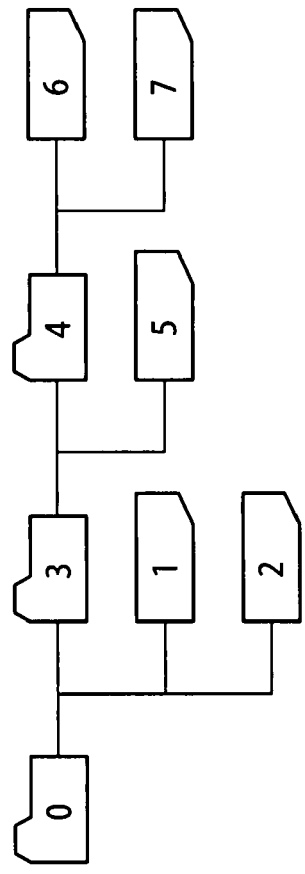
FIGS. 18A and 18B are diagrammatic views illustrating a play order.
Figure 18B:
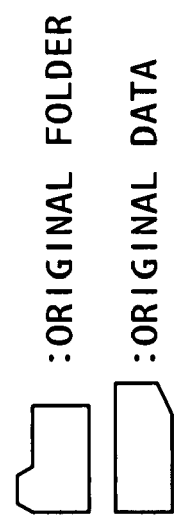
Figures 19A, 19B:
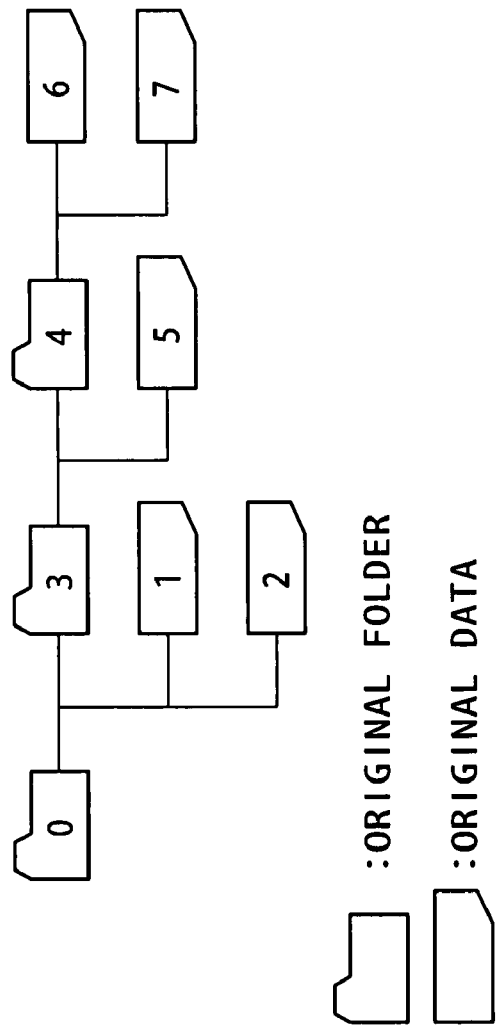
FIGS. 19A and 19B are similar views but illustrating another play order.

FIGS. 18A and 18B illustrate the Play-order where the favorite setting is removed from the example illustrated in FIGS. 14A and 14B in contrast with FIGS. 12A and 12B. The Play-order may be set in various manners. In particular, the Play-order may be set such that the entry to be generated first is set to the value 1 whereas the entries to be successively reproduced are set to successively incremented values in this manner. Or, the Play-order may otherwise be set such that, for example, the entry to be generated first is set to the value 0 whereas the entries to be successively reproduced are set to successively incremented values as seen through the contrast of FIGS. 19A and 19B with FIGS. 18A and 18B.

The data size of the property regarding each entry is set to the Entry Data Size next to the Play-order in the property entry header (FIG. 10).

In the succeeding Next-extends-entry, the number of an entry to be connected is recorded. In particular, where an extension region (the entry of the entry number 8) is set in the entry of the entry number 2 as described hereinabove with reference to FIGS. 15A, 15B, 17A and 17B, the entry number 8 which is data indicative of the extension region is set to the Next-extends-entry. Consequently, in the present embodiment, if extract information regarding a management object file is divided into a plurality of entries and the index file is generated based on the divisional entries, to one of the entries in which the divisional extract information is record, information indicative of another one of the entries in which the succeeding divisional extract information is recorded is set in the Next-extends-entry. Further, an identifier (Extends of the property entry flags) indicating that the entry has the succeeding divisional extract information recorded therein is set to the entry. Consequently, even if all entries are not searched, a coupling relationship between the entries can be detected rapidly, and the time required for the process can be reduces as much. Further, pieces of extract information can be grouped with regard to the property, title, thumbnail picture and intro which are attributes to generate an index file and identifiers (the 11th to 13th bits of the property entry flags) indicative of to which one of groups the extract information divided into a plurality of entries belongs is set so that the time required for the process can be further reduced.

In contrast, the Basic Property Data includes, as seen from FIG. 20, information (Format Brand) of the format of the corresponding management object file, information (Media Profile) relating to decoding of the corresponding management object file, and flags (Contents status flags) relating to contents of the management object file. The Basic Property Data further includes Creation Time of the management object file, editing date and hour (modification time) of the management object file, a Duration, a file identifier (Binary File Identifier) and a reference file number (Referred Counter).

The format information (Format Brand) in the basic property data represents the format of a management object file specified with the extension of the management object file, information stored in the file or the like and is acquired, for example, by the file management system of the optical disk 2. Meanwhile, the information (Media profile) regarding decoding is acquired, for example, from a control code set in elementary streams of video data and audio data, which form the QuickTime movie file. More particularly, the information (Media Profile) regarding decoding includes the types of codecs in elementary streams of video data and audio data, the bit rate, the number of frames of the video data, the sampling frequency of the audio data, the picture sizes of the video data in the vertical and horizontal directions and so forth.

Referring to FIG. 21, the flags (Contents status flags) regarding contents in the basic property data includes flags allocated to the first to third bits thereof and representative of whether or not chunks of the title, thumbnail picture, and intro data are present in the index data, respectively. Further, the flags include flags allocated to the fourth to sixth bits and representative of whether or not the title, thumbnail picture and intro data corresponding to the chunks of the title, thumbnail picture, and intro data are present in the original management object file, respectively. Further, the seventh and eighth bits are allocated to the reserved, and the ninth to sixteenth bits are allocated to information representative of the type of contents of the management object file (the type such as, for example, moving picture contents, still picture contents, or audio contents).

Referring back to FIG. 20, the 11th and 12th bites of the basic property data are set to the reserved, and the succeeding 13th to 16th bytes and the further succeeding 17th to 20th bytes are set to the Creation Time and the editing date and hour (modification time). To the Duration, reproduction time of the management object file is set.

The file identifier (Binary File Identifier) describes the location of the management object file, and in the present embodiment, the file name of a corresponding management object file or the folder name of a corresponding folder recorded on the optical disk 2 is allocated to the file identifier (Binary File Identifier). It is to be noted that, in case the location of a file cannot be represented with the region of the file identifier, the location of the file is represented by a URL (Uniform Resource Locator) of Property Extension Data hereinafter described. Therefore, in this instance, the property is represented with a variable length. Consequently, a management Object file corresponding to any of the entries described hereinabove with reference to FIGS. 12A, 12B, 14A, and 14B can be detected based on the file identifier (Binary File Identifier) or the URL set to the Property Extension Data.

Meanwhile, to the reference file number (Referred Counter) in the basic property data, the number of the other child files with regard to a child file referred to as described above with reference to FIGS. 16A and 16B is set. Consequently, in the example illustrated in FIGS. 16A and 16B, the reference file number of the value 1 is set to the entries of the child files having the entry numbers 2, 3, 5 and 6.

FIG. 22 illustrates the property extension data. The property extension data includes a reference file list (Referring File List), a Grouping File List, a URL, Private Property Data, and a Private Property Entry.

The reference file list is a list corresponding to a setting of the reference file number (Referred Counter) set in the basic property data and is formed by registering the entry numbers of referring side entries with respect to entries on the referring side which are in a referring relationship relative to each other into a list. Referring to FIG. 23, the reference file list includes information (Size) representative of the size of the reference file list, information (Type) representing that the list is a reference file list, and the entry number of a referring side entry. Consequently, for example, for entries (entry numbers 2, 3 and 5, 6) of two files obtained by division by the processing relating to the QuickTime described hereinabove, the entry numbers 1 and 4 are registered in the entry list as seen in FIGS. 16A and 16B. Therefore, in the present embodiment, to an entry of a child file, information indicative of an entry of a parent file is set in the reference file list.

In contrast, the Grouping File List is a list of entries, which belong to the same group, and includes information (Size) representative of the size of the grouping file list, information (Type) representing that the list is a grouping file list, and an entry number of an entry belonging to a group. The entry number is registered in order of reproduction among entries belonging to the group. Consequently, in the present embodiment, an entry, which describes the order of reproduction by the grouping file list in the form of a table, can be provided.

Figures 25A, 25B:
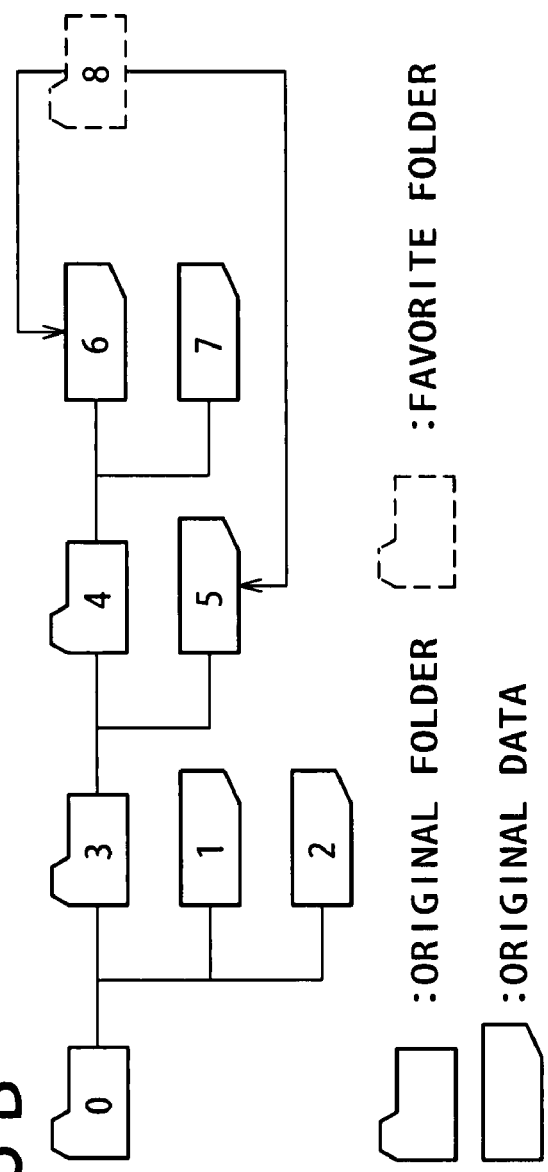
FIGS. 25A and 25B are diagrammatic views illustrating operation relating to the grouping file list.

Consequently, for example, as can be seen from the contrast of FIGS. 25A and 25B with FIGS. 14A and 14B, if an entry of a folder of favorites is registered based on the grouping file list, then a favorite can be registered even if an entry (entry numbers 9 and 10) corresponding to each favorite file is not registered newly as seen in FIGS. 14A and 14B. Consequently, increase of the data amount of the index file can be prevented as much. Therefore, the system controlling microcomputer 19 registers a favorite based on the grouping file list or through registration of individual entries described hereinabove with reference to FIGS. 14A and 14B in accordance with the description of the processing program. Further, the system controlling microcomputer 19 provides the titles or the like in a predetermined order in accordance with the favorites registered in such a manner as described above and further reproduces corresponding QuickTime movie files in the predetermined order.

In contrast, the URL describes locations of management object file corresponding to the individual entries when a location of a file cannot be represented with a file identifier of the basic property data as seen in FIG. 26. Consequently, in the present embodiment, a management object file corresponding to each entry can be detected.

To the Private Property Data, other extract information is allocated together with the Private Property Entry. The extract information described hereinabove is considered to be extract information, which can be utilized commonly by various application programs and various apparatus processing a QuickTime movie file, which is a management object file of the index file. In other words, the extract information can be regarded as information common to processing means for a management object file.

Such application programs and apparatus which manage a QuickTime movie file as described above sometimes record and retain unique information regarding a QuickTime movie file of an object of processing in such processing means as application programs and apparatus mentioned above. In such an instance, if a plurality of QuickTime movie files can be managed collectively with an index file, then the convenience in use can be further improved. In particular, the unique information may be information regarding a source of contents of each QuickTime movie file (such as, for example, a subtitle, the name of a broadcasting station from which the information is broadcast, camera information relating to image pickup conditions, or information of an apparatus used for the image pickup), information relating to contents (such as the name of the artist or the name of an album), or information relating to processing such as recording and reproduction (for example, information of self recording, an edit file, or picture quality correction or the like in an editing process, information representing that the file has been copied to an external apparatus, completion of reproduction, completion of editing or the like).

It is to be noted that, where there is no problem in compatibility in an application having a narrow range, the information described above can be defined as common information with a flag. However, where a plurality of applications are involved or an application having a wide range is involved, the Private Property Data of other extract information makes it possible to manage information unique to the application programs and apparatus relating to the management object files which is information not common to the application programs collectively with the index file making use of the Private Property Entry.

Therefore, the Private Property Data stores the unique information by processing means relating to the entry. FIG. 27 illustrates the private property data. The private property data includes information (Size) representative of the data amount of the private property data, information (Type) representing that the data is private property data, information (Owner) for specifying processing means of the application program, apparatus, and so forth relating to the private property data, and actual data (Private Data) of the unique information relating to the processing means.

Consequently, in the present embodiment, the application program or apparatus which is the processing means detects a registration of the private property data which specifies the private property data itself based on the information (Owner) which specifies the processing means. Then, the application program or apparatus acquires the unique information registered in the private property data and can therefore grasp a processing procedure and so forth regarding a large number of files which are an object of management of the index file.

On the other hand, the Private Property Entry registers unique information into the index file by such processing means as described above through reference to an external file. FIG. 28 illustrates the private property entry. The private property entry includes information (Size) representative of the data amount of the private property entry, information (Type) representing that the entry is a private property entry, information (Owner) for specifying processing means such as an application, an apparatus or the like relating to the private property entry, and information of the destination of reference. The information of the destination of reference is formed from information (Private File URL) representative of a location of an external file, an offset value (File Offset) representative of a location of corresponding information in the external file, and a Data Size.

Figures 29A, 29B, 29C:
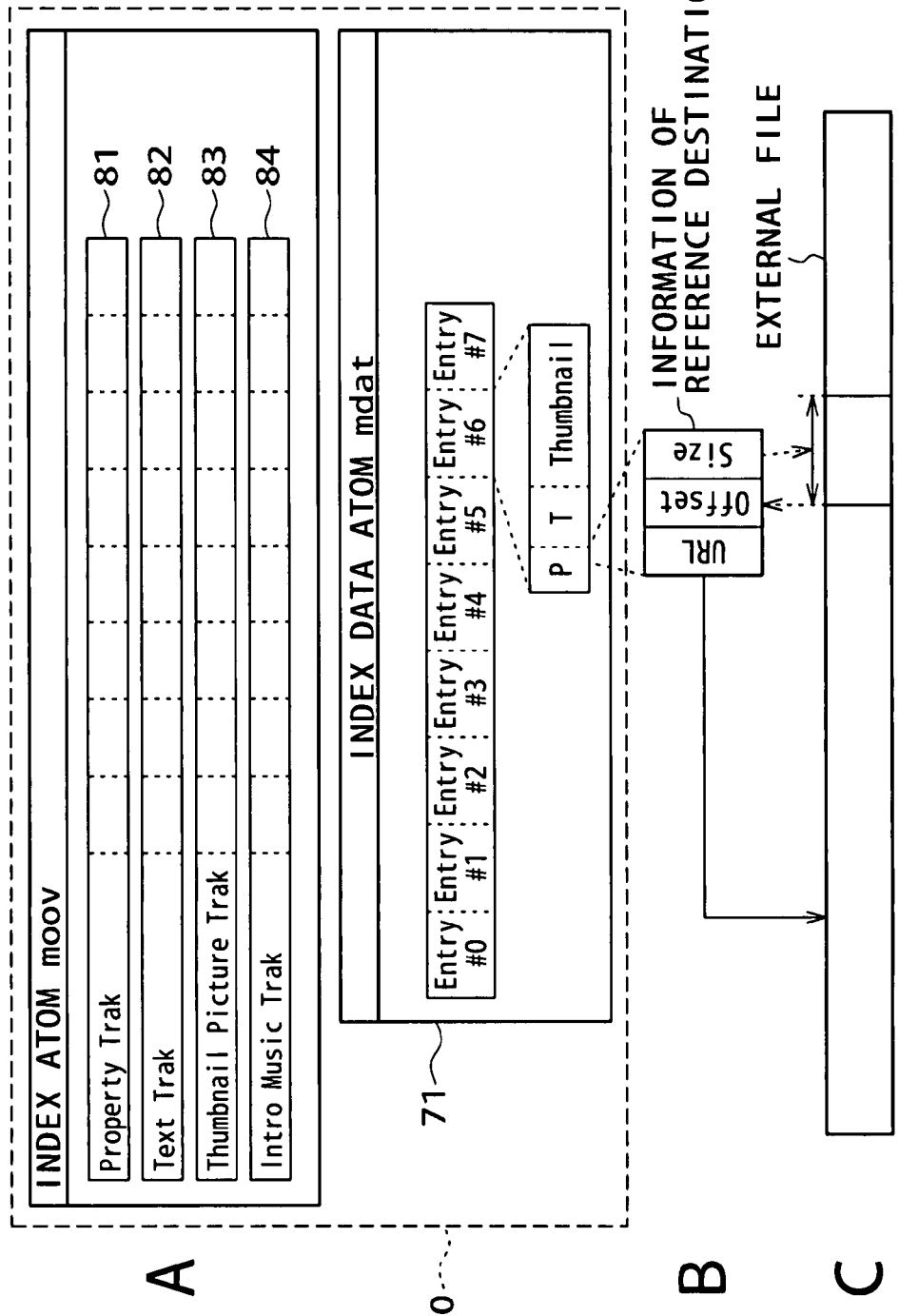
FIGS. 29A to 29C are diagrammatic views illustrating operation relating to the private property entry.

Thus, as seen in FIGS. 29A, 29B, and 29C, in the present embodiment, an application program or apparatus which is the processing means can detect a registration of a private property entry which specifies the private property entry itself with the information (Owner) which specifies the processing means and acquire data recorded in an external file based on information of the reference destination registered in the detected entry thereby to acquire information unique to the processing means. The unique information acquired in this manner can be utilized to grasp a processing procedure and so forth of a large number of files, which is an object of processing of the index file.

1-4. QuickTime Movie File

Figure 30:
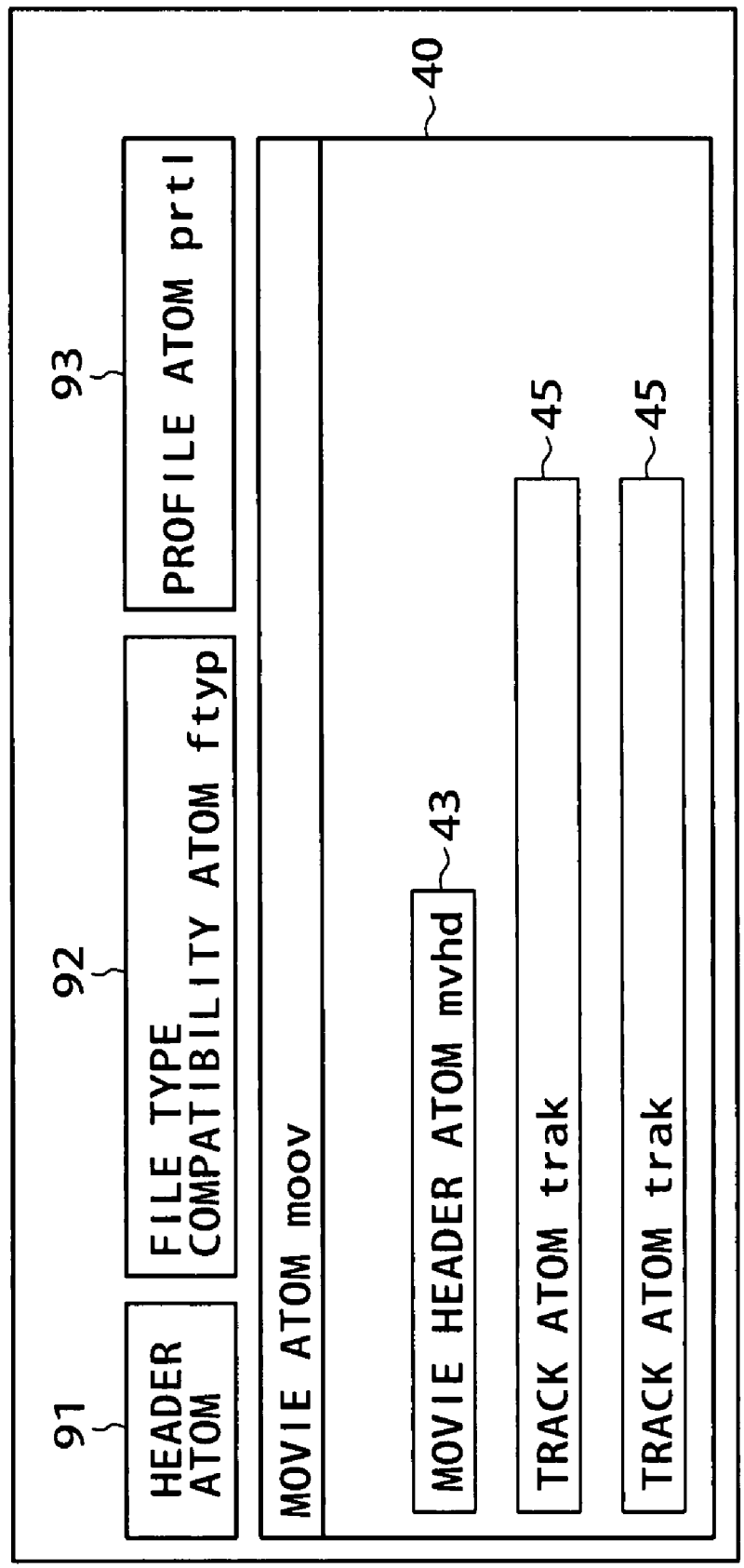
FIG. 30 is a diagrammatic view illustrating a QT movie file.

FIG. 30 illustrates a configuration on the movie atom 40 side regarding a QuickTime movie file recorded on the optical disk 2 by the optical disk apparatus 1. In the QuickTime movie file, a header atom 91, a file type compatibility atom 92 and a profile atom 93 are provided in a higher hierarchy above the movie atom 40. In the QuickTime movie file, information corresponding to the information (Format Brand) of the file format set to the property of the index data atom described hereinabove is set to the file type compatibility atom 92. Further, information corresponding to the information (Media profile) regarding decoding set to the property of the index data atom is allocated to the profile atom 93.

Consequently, in the QuickTime movie file, a criterion regarding whether or not reproduction and decoding are possible is provided on the top side of the file. Consequently, even if the QuickTime movie file is recorded separately from the index file on some other recording medium or the like, the discrimination of whether or not decoding is possible can be executed simply and rapidly.

FIG. 31 illustrates a configuration of the file type compatibility atom 92. In the file type compatibility atom 92, information (Size) representative of the size of the file type compatibility atom is allocated to the four top bytes. Further, information (Type) representing that the atom is a file type compatibility atom is allocated to the next four bytes. It is to be noted that type is set to the information (Type).

In the file type compatibility atom 92, a Major-Brand is registered in the further next 4 bytes. To the Major-Brand, an identifier corresponding to the extension of the QuickTime movie file is set. Consequently, in the present embodiment, it is possible to discriminate based on the Major-Brand whether or not the QuickTime movie file can be processed. It is to be noted that, in the present embodiment, the major brand is set, for example, to mqt.

To the following 4 bytes of the file type compatibility atom 92, a Minor-Version is allocated. To the Minor-Version, a version of specifications relating to the QuickTime movie file in the Major-Brand is allocated. Consequently, in the present embodiment, the Minor-Version can be utilized for discrimination of whether or not the processing is possible.

It is to be noted that the value provided by the Minor-Version is reference information, and it is not discriminated finally based on the value of the minor version whether or not the application or reproduction apparatus can interpret the format of the file. Accordingly, the form of the data to be stored in the minor version may differ among different specifications of the format indicated by the Major-Brand. Further, it is a possible idea to partition the field of the minor version in a unit of 4 bits in accordance with the format of the Major-Brand and place, for example, the version 1.3 as 0x00013000. In addition, an identifier of the file producer and/or the application program may be placed in the minor version. It is to be noted that, in this instance, it is a possible idea to use the most significant 8 bits as the integer part of the version number and use the succeeding 8 bits as the fractional part of the version number while the further succeeding 10 bits are used as the identifier of the file producer and the last 6 bits are used as an identifier of the application with which the file is generated such that, for example, the version number 1.16, the identifier 0 of the file producer and the identifier 1 of the application are represented as 0x01100001.

In the file type compatibility atom 92, a format (format compatible with the Major-Brand) relating to another extension with which the QuickTime movie file can be reproduced and decoded is recorded in the form of repetitions of the compatibility brand (Compatible-Brand). In particular, where the major brand is mqt, mqt, and qt are placed in the compatibility brand. Consequently, in the present embodiment, it can be detected that, also where a compatible application program or the like is used, the file can be reproduced.

FIG. 32 illustrates a configuration of the profile atom 93. To the profile atom 93, information (Size) indicative of the size of the profile atom 93 and information (Type (in this instance, prfl is set)) indicating that the atom is a profile atom are set. Further, a Version, various flags and a count value (feature-record-count) are set, and furthermore, various kinds of information regarding decoding are recorded in the form of repetitions of a list (feature-record-list). The count value (feature-record-count) indicates the number of the lists.

FIG. 33 illustrates a structure of the list (feature-record-list). The list (feature-record-list) includes a track-ID for successively specifying track atoms, a sub part track ID (sub-track-ID) for specifying a sub part track, information (feature) indicative of a type of information regarding decoding, and corresponding actual data (value). To the information (feature) indicative of a type of information regarding decoding, various items such as a type of a codec, a bit rate of data and a frame rate of video data can be set as seen in FIG. 34. Further, corresponding to the items, actual data can be set in the items. It is to be noted that FIG. 35 illustrates an example of setting of information regarding coding according to the list (feature-record-list). Consequently, in the present embodiment, it can be discriminated based on the profile atom 93 whether or not the QuickTime movie file can be processed without any trouble.

1-5. System Controlling Microcomputer 19

If an optical disk 2 is loaded into the optical disk apparatus 1, then the system controlling microcomputer 19 reproduces the index file together with management information regarding the file management system of the optical disk 2 and stores the index file into the built-in memory. Then, in response to an operation by the user, the system controlling microcomputer 19 updates the index file retained in the memory. Then, upon ejection of the optical disk 2 or the like, the system controlling microcomputer 19 updates the index file of the optical disk 2 with the index file retained in the memory. Further, the system controlling microcomputer 19 executes a reproduction process and so forth of a file recorded on the optical disk 2 based on the index file retained in the memory in this manner.

Figure 36:
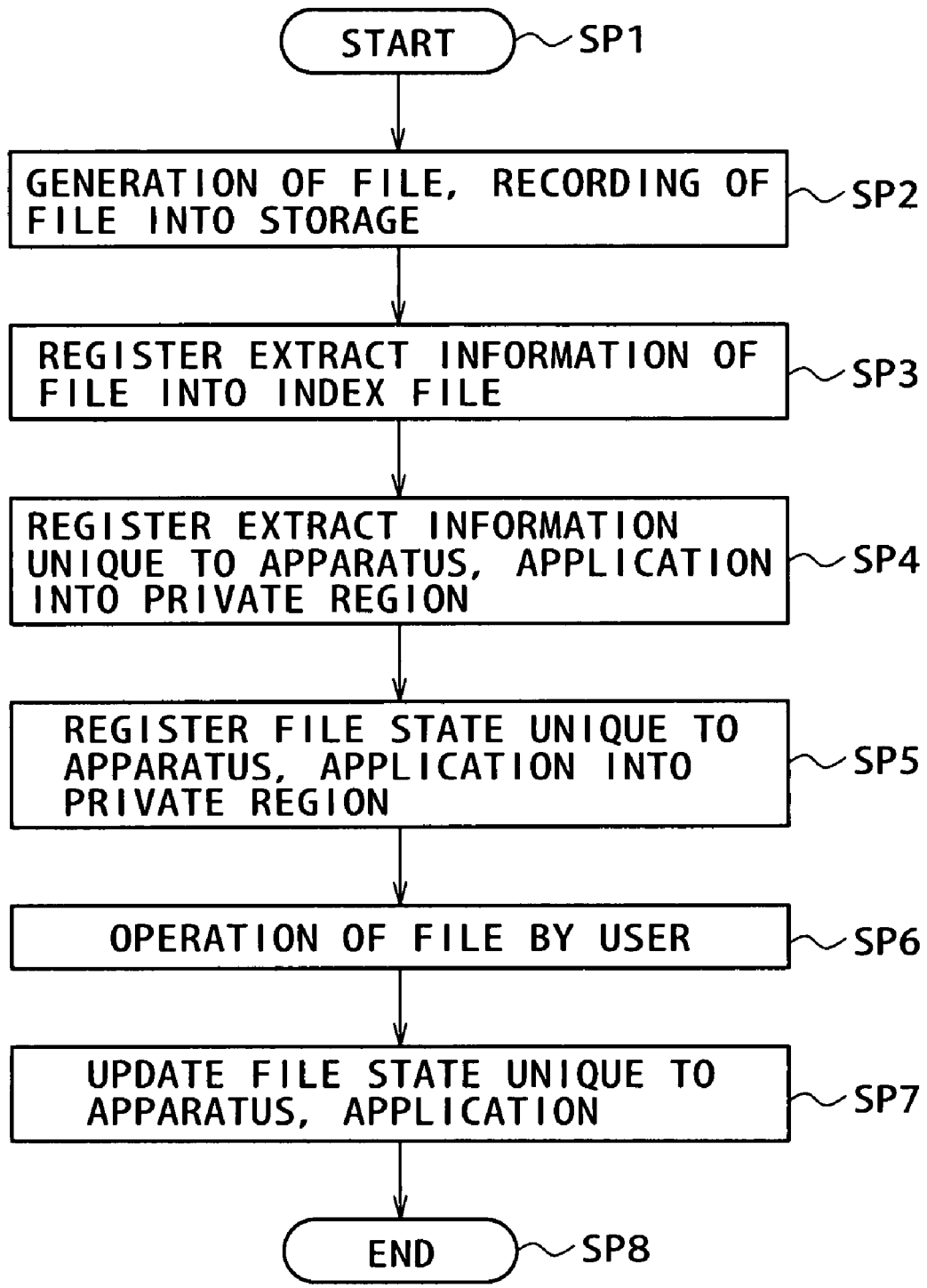
FIG. 36 is a flow chart illustrating a processing procedure of a system controlling microcomputer in a process of generating and updating an index file.

FIG. 36 illustrates a processing procedure of the system controlling microcomputer 19 in the process of generation and updating of the index file where the optical disk apparatus 1 is connected to a microcomputer so that it executes various processes under the control of the microcomputer. If an instruction to record a file is issued by the user, then the system controlling microcomputer 19 advances the processing from step SP1 to step SP2, at which it controls operation of the entire optical disk apparatus 1 to record video data and audio data successively inputted thereto on the optical disk 2. After the recording on the optical disk 2 comes to an end, the system controlling microcomputer 19 advances the processing to step SP3, at which it acquires extract information of the recorded file and registers the extract information into the index file retained in the built-in memory. Then at step SP4, the system controlling microcomputer 19 acquires unique extract information regarding an apparatus and an application program from the microcomputer serving as a source and registers the unique extract information into the index file. Further, at step SP5, the system controlling microcomputer 19 acquires information of processing states relating to the processes described from the microcomputer and registers the information into the index file.

After the index file is updated in this manner, if the user issues an instruction to operate the file such as deletion of the file at step SP6, then the system controlling microcomputer 19 controls the entire optical disk apparatus 1 so as to operate the file and then updates the index file so as to satisfy the instruction at step SP7. Thereafter, the system controlling microcomputer 19 advances the processing to step SP8, at which it ends the processing procedure.

Figures 17A, 17B:
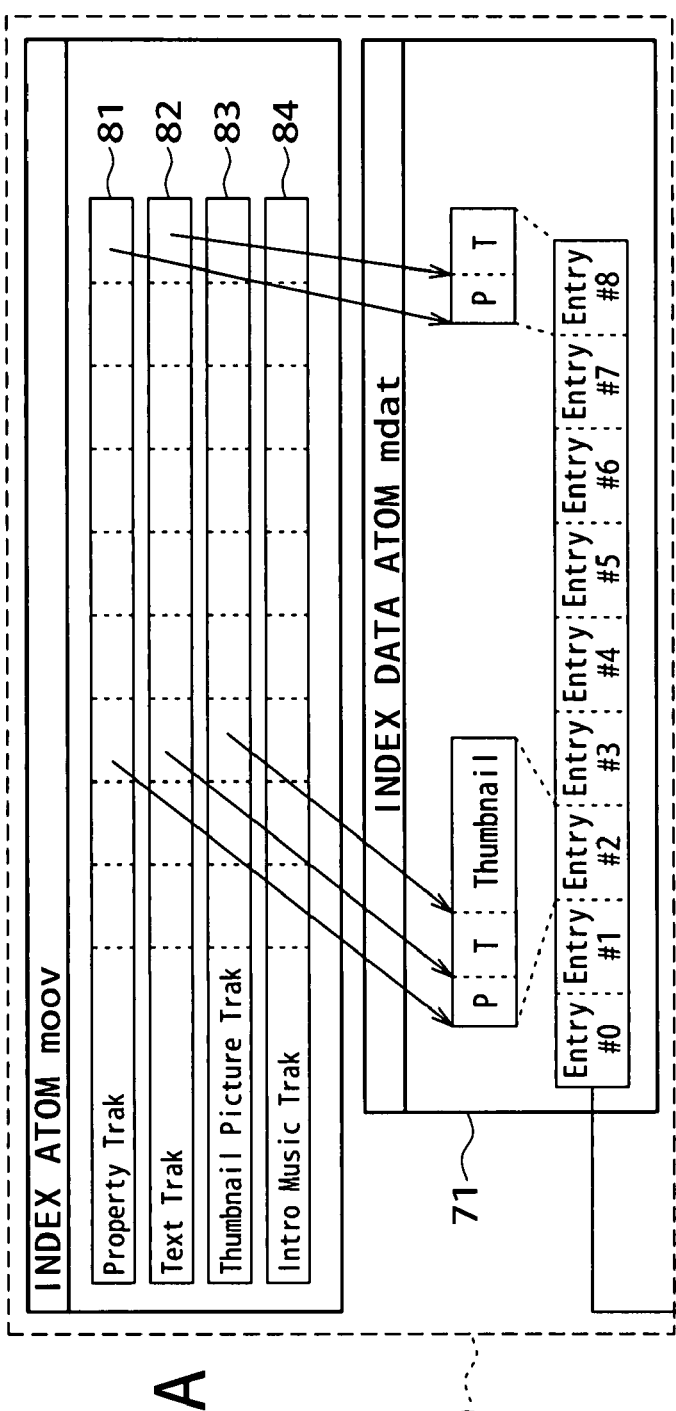
FIGS. 17A and 17B are diagrammatic views illustrating different extension of an entry.

After the index file is updated in this manner, if the user issues an instruction to display files recorded on the optical disk 2 in a table display, then the system controlling microcomputer 19 searches the property of each entry registered in the index data atom based on the property track of the index file. Further, in accordance with a designation of the user in such a table display as described above, the system controlling microcomputer 19 detects the corresponding entries of the title, thumbnail picture, and so forth through the search of the property. Then, the system controlling microcomputer 19 detects actual data of the title, thumbnail picture, and so forth of each entry registered in the index data atom in accordance with the records of the corresponding title track, thumbnail picture track, and so forth based on a result of the detection (refer to FIGS. 11A and 11B). For example, if the user issues an instruction to display a table of titles, then the system controlling microcomputer 19 detects actual data relating to the title in this manner and displays the thus detected titles in a table display. On the other hand, if the user issues an instruction to display thumbnail pictures in a table display, then the system controlling microcomputer 19 detects actual data relating to the thumbnail picture in this manner and displays the detected thumbnail pictures in a table display.

Where the extract information of the property, title or the like is divided with a variable length and recorded in a plurality of entries, in the processes described above, the system controlling microcomputer 19 successively acquires the divisional pieces of extract information of the files and regenerates the original extract information prior to the division based on the setting of the Property Entry Flags and provides the regenerated extract information to the user (FIGS. 17A and 17B). On the other hand, if the corresponding file is a plurality of files obtained by dividing one set of contents, then the system controlling microcomputer 19 provides only actual data of the parent file to the user based on the setting of the property entry flags and the setting of the reference file list (FIG. 23).

If the user does not issue any instruction, then the system controlling microcomputer 19 selectively acquires the title and so forth regarding the original entry in this manner based on the setting of the Property Entry Flags and displays the acquired information in a table display. On the other hand, if the user issues an instruction to display in a table display based on the favorite, then the system controlling microcomputer 19 selectively acquires the titles and so forth of the favorite entries based on the setting of the Property Entry Flags and further based on the setting of the group entry list (FIG. 24) and displays the acquired information in a table display (FIGS. 14A and 14B). In the table display, the information is displayed in the set order of the play order in a table display.

In such a user interface display as just described, the system controlling microcomputer 19 selectively acquires only actual data regarding those files which can be processed normally by the optical disk apparatus 1 with reference to the information (Format Brand) regarding file format set in the basic property data, and to the information (Media Profile) regarding decoding and forms a table display of the actual data. Consequently, in the present embodiment, a user interface is provided only with regard to those files, which can be processed normally through a search of the index file performed beforehand.

Figure 37:
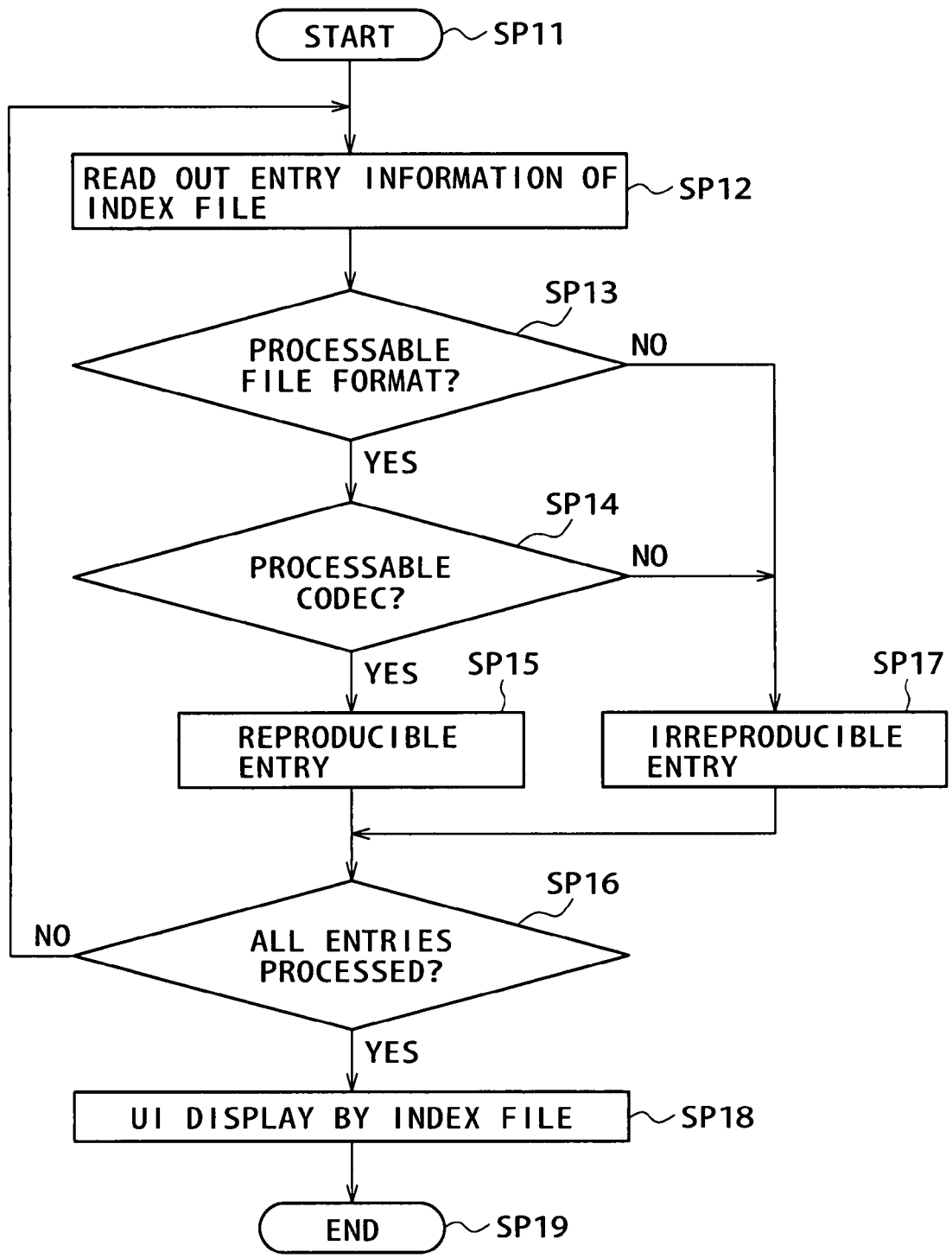
FIG. 37 is a flow chart illustrating a processing procedure of the system controlling microcomputer relating to a user interface.

FIG. 37 illustrates a processing procedure of the system controlling microcomputer 19 in the search process performed beforehand in this manner. Referring to FIG. 37, if an instruction for a table display is issued by the user, then the system controlling microcomputer 19 advances the processing from step SP11 to step SP12, at which the system controlling microcomputer 19 reads out information from an entry of the index file. Then at step SP13, the system controlling microcomputer 19 discriminates based on the information (Format Brand) of the file format set to the entry whether or not the management object file of the entry has a format which can be processed by the optical disk apparatus 1, that is, whether or not the management object file has a format which can be processed normally by the file decoder 16.

If an affirmative result is obtained at step SP13, then the system controlling microcomputer 19 advances the processing to step SP14, at which it is discriminated based on the information (Media Profile) regarding decoding whether or not the management object file of the entry can be decoded normally by the optical disk apparatus 1. More particularly, it is discriminated whether or not the management object file can be decoded without suffering from such a fault as a frame miss or a freeze by the video decoder 13 and besides whether or not the management object file can be decoded without suffering from a sound interruption, a sound skip or the like by the audio decoder 14.

If an affirmative result is obtained at step SP14, then the system controlling microcomputer 19 advances the processing to step SP15, at which it sets the entry as an entry of a reproducible file to a display object of the user interface, whereafter it advances the processing to step SP16. At step SP16, the system controlling microcomputer 19 discriminates whether or not the processing is completed for all of the entries registered in the index file. If a negative result is obtained, then the system controlling microcomputer 19 returns the processing to step SP12, at which it starts processing for the next entry.

On the other hand, if a negative result is obtained at step SP13 or SP14, then the system controlling microcomputer 19 advances the processing to step SP17, at which it determines the entry as en entry which is difficult to reproduce and excludes the entry from a display object by the user interface, whereafter the system controlling microcomputer 19 advances the processing to step SP16. Consequently, the system controlling microcomputer 19 repeats the pressing procedure of steps SP12→SP13→SP14→SP15→SP16→SP12 or steps SP12→SP13→SP17→SP16→SP12 or else steps SP12→SP13→SP14→SP17→SP16→SP12 for each entry thereby to successively select display objects of the user interface. Then, after the system controlling microcomputer 19 completes the processing for all of the entries, since an affirmative result is obtained at step S16, the processing now advances from step SP16 to step S18. At step SP18, the system controlling microcomputer 19 displays the user interface based on the entries of the display objects detected in this manner. Thereafter, the system controlling microcomputer 19 advances the processing step SP19, at which it ends the processing procedure.

Consequently, in the present embodiment, even if the management information of the file management system is not searched to discriminate the format thereof every time and a file is not decoded actually in accordance with the discriminated format, only a notification of those files which can be processed normally can be issued to the user in such a manner as to allow selection by the user.

When the original files or favorite files are displayed in a table display in this manner, if the user issues an instruction to reproduce the files, then the system controlling microcomputer 19 issues an instruction to reproduce the files successively in accordance with the play order set to the entries displayed in the table display or with the reproduction order set to the index file in accordance with the records of the group file list (FIGS. 25A and 25B). Further, if the user selects a file from within the table display and issues an instruction to reproduce the file, then the system controlling microcomputer 19 issues an instruction to reproduce the selected file. Consequently, in the present embodiment, a desired file can be detected rapidly from among a large number of files recorded on an optical disk with reference to the index file.

1-6. Operation of the First Embodiment

In the optical disk apparatus 1 (FIG. 1) having the configuration described above, video data and audio data acquired by the image pickup section and the sound acquisition section are encoded by the video encoder 11 and the audio encoder 12, respectively, and then converted into a data stream of a QuickTime movie file by the file generator 15. The data stream is recorded on the optical disk 2 through a recording system including the memory controller 18, error correction encoder/decoder 21, data modulator/demodulator 23, magnetic field modulation driver 24 and optical pickup 33. Consequently, in the optical disk apparatus 1, an image pickup result is recorded in the form of a QuickTime movie file on the optical disk 2. Further, output data of the system controlling microcomputer 19 is outputted to the recording system of the optical disk apparatus 1 so as to be applied to recording of a file on the optical disk 2, and consequently, management information regarding the file management system of the optical disk 2 is updated so as to correspond to the record of the QuickTime movie file.

The QuickTime movie file recorded in such a manners as described above is successively reproduced through the optical pickup 33, data modulator/demodulator 23, error correction encoder/decoder 21 and memory controller 18 based on the management information of the file management system and then decomposed into elementary streams of video data and audio data by the file decoder 16. Then, the elementary streams of video data and audio data are decoded by and outputted from the video decoder 13 and the file generator 15, respectively.

In the optical disk apparatus 1, upon such recording of a QuickTime movie file, data for a thumbnail image and data for intro are acquired from the file generator 15 by the system controlling microcomputer 19. Further, data of the title is acquired as a result of inputting of the user or the like before or after the recording of the file by the system controlling microcomputer 19. Further, information of the file name and so forth relating to the file management system is acquired. Thus, extract information of the QuickTime movie file recorded on the optical disk 2 is collected by the system controlling microcomputer 19. In the optical disk apparatus 1, an index file is generated from the extract information acquired in such a manner as described above in the memory built in the system controlling microcomputer 19 similarly to management information relating to the file management system of the optical disk 2. The index file is recorded on the optical disk 2 similarly to the QuickTime movie file. Further, the management information of the file management system is updated so as to correspond to the record of the index file.

In the generation process of the index file in the system controlling microcomputer 19, the extract information is classified for each attribute, and an index data atom 71 (FIG. 4) is formed from an entry of a chuck so as to correspond to the record of the QuickTime movie file for each attribute. Further, the track atoms 81 to 84 are formed with the reference information of the index data atom 71. Further, information representative of an attribute of each entry, information representative of a relationship between entries and so forth are set to the entry of the property. Further, the information representative of the relationship between the entries is updated corresponding to the processing of the file recorded on the optical disk 2.

For example, if an instruction of a reproduction order, which is, in a default state, same as an order in which the files are recorded, is issued as the information representative of the relationship between the entries, then information (Play-order) representative of the entries and a reproduction order of the files corresponding to the entries are set in accordance with the order (FIGS. 14A and 14B). On the other hand, if the user registers desired files as files of a favorite group, then an entry of a virtual file structure including of the favorite group is registered, and information (Play-order) of a reproduction order in the group is set (FIGS. 14A and 14B). An entry of a favorite folder is registered in place of the entry according to such a virtual file structure, and information of a reproduction order is set in the form of a reference list in the entry (FIGS. 25A and 25B).

Consequently, in the present embodiment, a reproduction order can be designated with the index file, which collectively manages a large number of files recorded on the optical disk 2, and the operability can be further improved than ever as much making use of the index file effectively. In other words, if a reproduction order is not designated in this manner, then the reproduction order relies upon an apparatus or an application program. However, where the application order can be designated in this manner, a large number of files can be reproduced in accordance with an order intended by the user, and also a simple editing process or the like can be executed on the index file.

Further, in regard to a favorite, if an entry of a favorite folder is registered in place of an entry according to a virtual file structure and information of a reproduction order is set in the form of a reference list into the entry, then where a plurality of different favorites are registered, or even where a large number of files are registered in one favorite, increase of the data amount in the index file can be prevented. Consequently, the processing time can be reduced as much with the index file, and also by this, the operability can be further improved than ever.

Further, when the actual data amount of property data, thumbnail picture data or the like exceeds a data amount set to each chunk as a result of addition of a sub title or the like, for example, by an editing process, an entry relating to an extension region is registered additionally, and corresponding extract information is divided into and recorded as a plurality of entries including the original entry and the additional entry or entries (FIGS. 15A and 15B). Then, as information representative of a relationship between the entries, information (Next Extends Entry) representative of an entry in which succeeding extract information is recorded is set to the entry relating to the extract information divided, and an identifier (Extends) representing that the entry has the succeeding extract information recorded therein is set to the entry in which the extract information is recorded.

Consequently, in the present embodiment, even if all entries are not searched, an entry can be detected simply and rapidly. Consequently, the operability can be improved further than ever.

For an extension region relating to each title entry, thumbnail entry or intro entry generated by grouping extract information for each attribute, an identifier representative of to which group the divisional extract information belongs is set to the entry relating to the corresponding property (FIGS. 17A and 17B). Consequently, where extract information relating to, for example, the title is recorded with a variable length, it is possible to detect from the property that the data relating to the extension is the title and regenerate the extract information prior to the division through the property. Consequently, the extract information can be detected simply and rapidly, and as a result, the operability can be improved further than ever.

If a continuous record of an image pickup result becomes so long that contents by the image pickup result approaches a limit by the file management system, then recording of the image pickup result on the film is stopped once, and a succeeding image pickup result is recorded into another file. Consequently, in this instance, one piece of contents is recorded in a plurality of child files. Further, a management file for managing the plural child files is generated as a parent file in accordance with the prescriptions of the QuickTime and recorded on the optical disk 2. Consequently, in this instance, the plural child files are successively reproduced in accordance with an instruction to reproduce the management file. Thus, a long and great piece of contents exceeding the limit to the capacity by the file management system can be recorded on and reproduced from the optical disk 2. Further, also when one of files obtained by an editing process of a single file tries to refer to the original file, a relationship of reference files occurs wherein the original file and the files obtained by the editing serve as a parent file and child files, respectively.

In such an instance as just described, an identifier representing that an entry relates to a child file or a parent file is set as information representative of a relationship between the entries in each of entries of the child files and the parent file, respectively (FIGS. 16A and 16B). Further, in an entry of a child file, information representative of the entry of the parent file is set. In addition, an entry relating to another file to be referred to is recorded in a reference file list.

Consequently, in the present embodiment, a relationship between a plurality of entries having a mutually referring relationship to each other can be grasped simply and rapidly. Also this can improve the operability further than ever.

Further, information (Format Brand) of the file format of a management object file and information (Media Profile) relating to decoding are registered in each entry. Consequently, a file, which is difficult to reproduce and decode, can be hidden against the user or prevented from being selected by the user. Also this can improve the operability further than ever.

In particular, in the present embodiment, information (Format Brand) of the file format and information (Media Profile) regarding decoding of each entry registered in the index file are searched, and only the entries of those files, which can be processed normally, are selected. Then, the user interface according to the title, thumbnail picture, or the like regarding each of the selected entries is displayed. Consequently, only those files, which can be reproduced normally, can be selectively provided to the user, and also this can further improve the operability.

Figure 38:
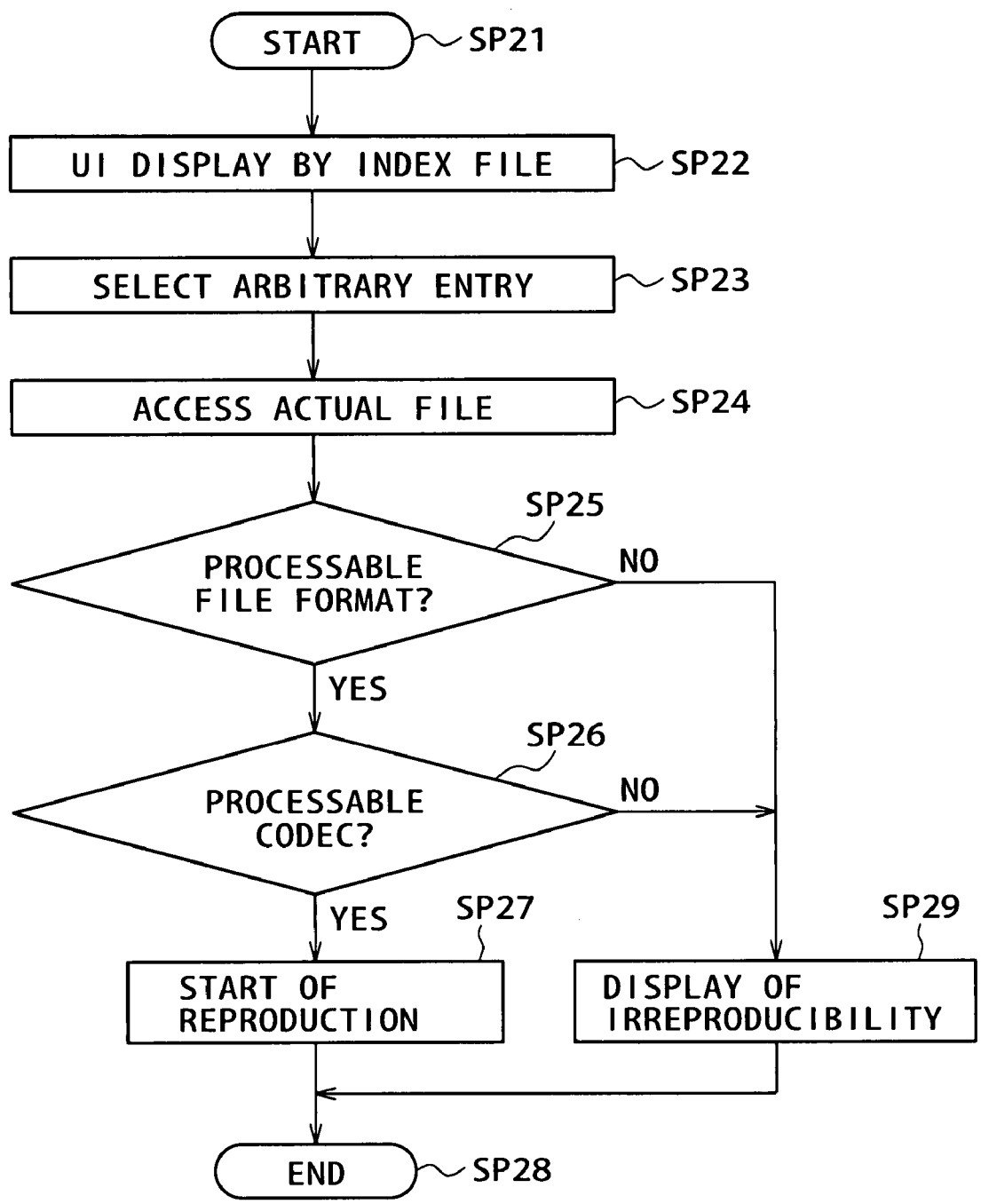
FIG. 38 is a flow chart illustrating a common processing procedure for the contrast with the processing procedure illustrated in FIG. 37.

FIG. 38 illustrates a possible processing procedure, which can be used where the user interface is not selectively provided with reference to information (Format Brand) of the file format and information (Media Profile) necessary for decoding in contrast with the processing procedure of FIG. 37. The processing procedure is executed, for example, in order to reproduce an optical disk 2 loaded in a microcomputer. In this instance, the microcomputer advances its processing from step SP21 to step SP22, at which it displays the interface of management object files including those files which cannot be reproduced or decoded normally with an index file.

Then at step SP23, the microcomputer accepts selection of an entry based on the user interface, and then at step SP24, the microcomputer reproduces a file corresponding to the selection of the user from the optical disk 2. Then, at step SP25, the microcomputer selects an application program, which can be used for the reproduction based on the extension of the file using the extension of the file, and passes the file reproduced from the optical disk 2 to the selected application program.

If the microcomputer discriminates at next step SP26 that the file can be processed and decoded using the application program, then it advances the processing from step SP26 to step SP27, at which the file decoded using the application program is provided to the user. Thereafter, the microcomputer advances the processing to step SP28, at which it ends the processing procedure. In the series of processes described, for example, where the processing speed of the central processing unit is low or where the capacity of the memory is insufficient the display may temporarily freeze or the image is displayed in a frame skipping state. This gives a very disagreeable feeling to the user, and in an extreme case, a doubt of a failure of the apparatus is given to the user.

On the other hand, for example, if a corresponding application program cannot be detected, then the microcomputer advances the processing from step SP25 to step SP29, at which the microcomputer displays an error message representing that the file cannot be reproduced. Thereafter, the microcomputer advances the processing to step SP28, at which it ends the processing procedure. On the other hand, if it is difficult to decode the file because, for example, the application program is not ready for the version of the file, then the microcomputer advances the processing from step SP26 to step SP29. Consequently, also in this instance, a doubt of a failure of the apparatus is given to the user.

In contrast, where the user interface only of those files, which can be processed normally, is provided through selection performed beforehand as in the present embodiment, such a disagreeable feeling to the user as described above can be eliminated. Further, since the user interface only of those files, which can be processed normally, is provided in this manner, also the user interface to be provided to the display can be made neat, and the convenience in use by the user can be improved.

On the other hand, for example, where the optical disk apparatus 1 is connected to a computer and a file is processed using an application program of the computer, information unique to the processing means is registered together with information for specifying the processing means based on a record of the entry or through reference to an external file. Consequently, for example, where the application program is for editing a file recorded on the optical disk 2, a large number of files of picked up images can be classified into processed scenes and non-processed scenes based on the unique information so as to facilitate later processing of the file.

As such unique information, also information regarding a source is recorded. This information can be utilized for identification between a file generated by dubbing on an optical disk 2 using the computer connected to the optical disk apparatus 1 and another file obtained using the image pickup system of the optical disk apparatus 1.

From the foregoing, in the present embodiment, an application program, an editing apparatus, a reproduction apparatus, or a like apparatus can effectively utilize the unique information retained in the index file to simplify management and processing of a large number of files. Consequently, the operability can be improved further than ever.

1-7. Advantages of the First Embodiment

With the configuration described above, an index file of files recorded on a recording medium is generated from a series of entries in the form of blocks of extract information coordinated with the files, and information representative of the entries and a reproduction order of files corresponding to the entries is set as information representative of a mutual relationship between the entries. Consequently, the files can be reproduced in an intended order, and the operability can be improved significantly further than ever.

Further, in this instance, where a reproduction order is set within a group of entries selected from among the entries provided in the index file, since the group includes favorite entries selected by the user, also the favorite files can be reproduced in an intended order. Consequently, the operability can be improved significantly further than ever.

Further, where an entry, which describes a reproduction order in the form of a table, is provided, an increase of the data amount of the index file can be reduced thereby to prevent a drop of the processing speed.

Further, where extract information regarding one file is divided to generate an index file from a plurality of entries and information indicative of an entry in which succeeding extract information is recorded and an identifier indicating that the entry has the succeeding extract information recorded therein are set as information representative of a mutual relationship between the entries, the extract information divided into the plural entries can be regenerated simply and rapidly. Thus, a drop of the processing speed can be prevented effectively as much, and the operability can be improved significantly further than ever.

Further, where an index file is generated from different pieces of the extract information grouped for each attribute and an identifier is set such that it indicates to which one of the groups each of the divisional extract information belongs, the extract information can be managed in a unified manner and the divided extract information can be regenerated simply and rapidly. Thus, a decrease of the processing speed can be prevented effectively as much, and the operability can be improved significantly further than ever.

Further, in such a case that a plurality of child files are generated by dividing one set of contents and a parent file manages the plural child files, if an identifier corresponding to each of entries of the child files and the parent file is set as information representative of a mutual relationship between the entries, then a reference relationship between the parent and child files can be grasped simply and rapidly. Thus, a drop of the processing speed can be prevented effectively as much, and the operability can be improved significantly further than ever.

At this time, also where information indicating an entry of the parent file is set to the entry of each of the child files, a reference relationship between the parent and child files can be grasped further simply and rapidly. Thus, a drop of the processing speed can be prevented effectively as much, and the operability can be improved significantly further than ever.

Further, where information of the file format is registered into a corresponding entry and besides information regarding decoding of a file is registered into a corresponding entry, the operability can be improved significantly further than ever.

Further, where information unique to processing means for a file and information for specifying processing means regarding the unique information are registered, the operability can be improved significantly further than ever.

At this time, where the unique information is set to the corresponding entry to register the unique information or a reference destination of the unique information is set to the corresponding entry to register the unique information, an increase of the processing time relating to the index file can be coped with effectively. Consequently, the operability can be improved significantly further than ever.

Further, where the index file is formed from an index data atom, which is a group of data of extract information, and a track, which is a group of management data for managing the data group, resources relating to QuickTime movie files can be utilized effectively with a hierarchical structure of the QT movie files to generate the index file. The overall configuration can be simplified as much.

2. Second Embodiment

Figure 39A:
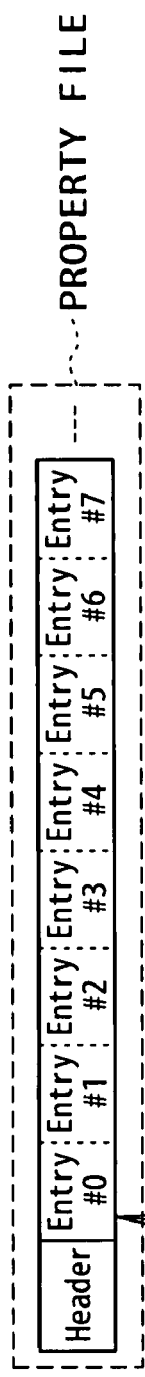
FIGS. 39A to 39D are diagrammatic views illustrating an index file according to a second embodiment of the present invention.
Figure 39B:
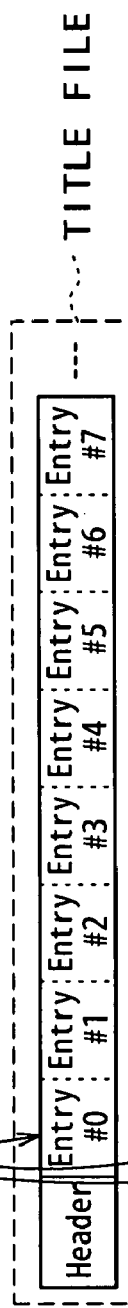
Figure 39C:
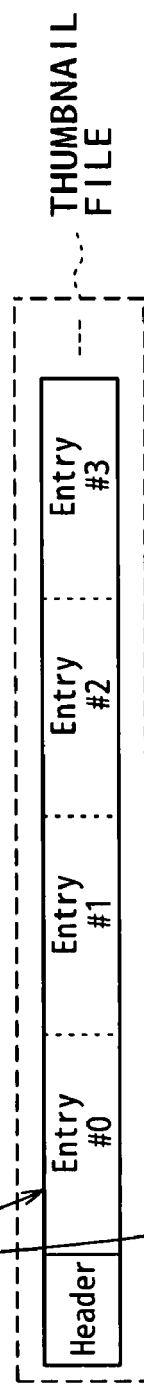
Figure 39D:
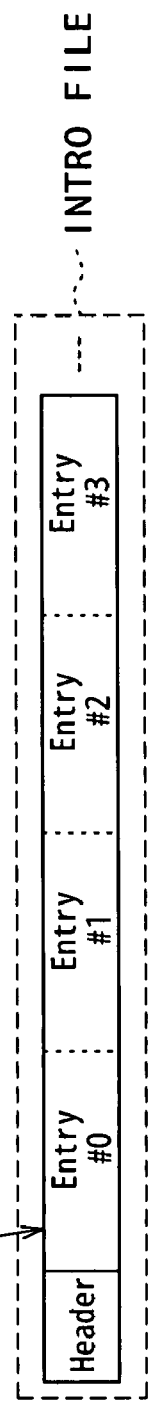

FIGS. 39A to 30D illustrate an index file according to a second embodiment of the present invention. In the present embodiment, different pieces of extract information are grouped for each attribute to generate different files. Further, management data for managing the data groups are allocated to a property file generated by such grouping. It is to be noted that the optical disk apparatus according to the present embodiment has a same configuration as the optical disk apparatus 1 according to the first embodiment except that it is different in configuration of the index file.

In particular, the index file according to the present embodiment includes a property file to which data of the property are applied, a title file to which data of the title are allocated, a thumbnail file to which data of the thumbnail picture are allocated, and an intro file to which intro data are allocated. Each of the files includes a header and entries.

To each entry of the property file of the index file, a property entry header, basic property data, property extension data, and reference data are allocated. The property entry header, basic property data, and property extension data are formed in a similar manner as in the first embodiment. In contrast, the reference data is provided corresponding to the title file, thumbnail file, and intro file such that corresponding entries of the title file, thumbnail file, and intro file can be detected from the property file.

In particular, referring to FIG. 40, the reference data includes information (Size) indicative of the size of the reference data, information (Type) indicative of the type of the reference data, information (File URL) indicative of the location of a corresponding file, a start position (File Offset) of a corresponding entry of the file, and a data length (Data size) of the corresponding entry.

Consequently, the system controlling microcomputer 19 according to the present embodiment adds or updates an entry with respect to the configuration illustrated in FIGS. 39A to 39D and 40.

Also where an index file is formed from different files in which extract information for each attribute is placed, similar advantages to those of the first embodiment can be anticipated.

3. Third Embodiment

FIG. 41 illustrates part of an index file according to a third embodiment of the present invention. In the present embodiment, extract information is grouped for each attribute to form different files including a property file, a title file, a thumbnail file, and an intro file similarly as in the second embodiment. Further, to the property file from among the files, reference data of the other files are allocated. Where the property file, title file, thumbnail file, and intro file are formed, each entry of the property file is formed from a property entry header, basic property data, and property extension data similarly as in the first embodiment. Further, the basic property data is formed in such a manner as illustrated in FIG. 41.

The basic property data is formed from information (Offset and Size) representative of the positions of a corresponding entry in the title tile, thumbnail file, and intro file in addition to the basic property data described hereinabove with reference to FIG. 20. The present embodiment has a configuration same as that of the second embodiment except that it is different in configuration regarding the basic property data. It is to be noted that, in this instance, where the size is defined as a fixed size, the information of the Size can be omitted.

Also where an index file is formed from extract information grouped for each attribute into different files such that reference data is included in the basic property data, similar advantages to those of the second embodiment can be anticipated.

4. Fourth Embodiment

In the present embodiment, data groups of extract information are formed as external files to form an index file. In particular, as seen in FIG. 42, the index file includes a resource file, a property file, a title file, a thumbnail file, and an intro file. The resource file is formed from an index file atom described hereinabove with reference to FIG. 4. Further, information indicative of the locations of the property file, title file, thumbnail file, and intro file is registered for each entry on tracks of the resource file.

Each of the property file, title file, thumbnail file, and intro file is formed from a header and a series of entries of actual data.

Also where data groups of extract information and a management data group for managing the data groups are formed as separate files, similar advantages to those of the first embodiment can be anticipated. Further, where the configuration just described is employed, only when it is tried to access only particular extract information, a high processing speed can be achieved. Also it is possible to output a file of corresponding extract information to an external apparatus so as to be used for processing by the external apparatus.

5. Fifth Embodiment

In the present embodiment, information regarding a file structure is registered into an index file in addition to information regarding decoding described hereinabove in connection with the first embodiment.

In particular, the QuickTime format has a high extensibility and can use, for example, as a data storage system, an external reference system wherein an external file is referred to, and a self-contained type wherein data is stored in a file. Consequently, for example, where the optical disk apparatus 1 is not ready for the external reference system, it cannot process a file of the external reference system at all. Therefore, in the present embodiment, information regarding the file structure is registered into an index file, and it is discriminated whether or not a file can be reproduced normally based on the information regarding the file structure and information regarding decoding.

In the present embodiment, the information relating to the file structure is set as a profile atom to each QuickTime movie file similarly to the information regarding decoding, and the information set to the profile atom is registered as actual data into the corresponding property of the index file. Particularly, the information regarding the file structure includes information of whether or not a fragment movie atom is present, whether or not a modification track is present, whether or not an alternative track is present, whether or not external reference is possible, whether or not self-containment is present, and whether or not a chunk size atom is present.

If information regarding decoding and information regarding a file structure are registered in the index file as in the present embodiment, then where further various files are recorded, it is possible to provide only those files, which can be reproduced normally, to the user thereby to improve the convenience in use.

6. Other Embodiments

While, in the first embodiment described hereinabove, groups of data of extract information and groups of management data for managing the groups of data are retained integrally with a QuickTime file structure to form an index file, the present invention is not limited to this, but various formats can be applied as occasion demands.

While the embodiments described above relate to a case wherein the present invention is applied to an optical disk apparatus to record an image pickup result, an output of a personal computer, and so forth, the present invention is not limited to this. The present invention can be applied widely to another case wherein a large number of files recorded on various recording media such as a magneto-optical disk and a hard disk are managed or another case wherein a large number of files retained in a predetermined server are managed.

Further, in the embodiments described above, a management object file in the form of a QuickTime movie file is managed. However, the present invention is not limited to this but can be applied widely to various cases such as a case wherein files of video data and files of audio data of various formats are managed.

Further, in the embodiments described above, an index file is recorded together with a management object file. However, the present invention is not limited to this and can be applied widely to various cases such as a case wherein the index file is recorded on a recording medium different from that on which the management object file is recorded or another case wherein the index file is retained on a server different from that on which the management object file is recorded.

While preferred embodiments of the present invention have been described using specific terms, such description is for illustrative purposes only, and it is to be understood that changes and variations may be made without departing from the spirit or scope of the following claims.

What is claimed is:

1. A recording apparatus for recording desired files on a recording medium, comprising:
    index file generation means for generating an index file of the files recorded on the recording medium in the form of a series of entries each in the form of a block of extract information relating to and coordinated with one of the files;
    said index file generation means registering information regarding decoding of the files into corresponding ones of the entries, the index file generation means further registering parent entry information regarding a parent entry of each entry in the index file,
    wherein the index file generation means allocates a unique code to each entry,
    wherein the index file includes a plurality of tracks for indexing the series of entries, and the plurality of tracks include a property track, a text track, and a thumbnail track, and the plurality of tracks uses the unique code to index the series of entries,
    when the index file includes a predetermined number of property flags for each entry, the predetermined number of property flags including a first flag to identify whether the entry represents a folder, a second flag to identify whether the entry is a favorite entry set by a user, a third flag to identify whether the entry is valid set in accordance with a deletion of the file associated with the entry, and a fourth flag to identify whether the tile associated with the entry refers to another file, wherein the property track includes a header portion having a first fixed length, a basic property portion having a second fixed length, and a property extension portion having a variable length, and wherein the parent entry represents a folder which a file associated with a child entry belongs to.

2. A file management method for managing a plurality of files retained in a predetermined region, comprising the steps of:

generating an index file of the plurality of files in the form of a series of entries each in the form of a block of extract information relating to and coordinated with one of the files;

registering information regarding decoding of the files into corresponding ones of the entries; and registering parent entry information regarding a parent entry of each entry in the index file, wherein the generating step allocates a unique code to each entry, when the index file includes a predetermined number of property flags for each entry, the predetermined number of property flags includes a first flag to identify whether the entry represents a folder, a second flag to identify whether the entry is a favorite entry set by a user, a third flag to identify whether the entry is valid set in accordance with a deletion of the file associated with the entry, and a fourth flag to identify whether the file associated with the entry refers to another file, wherein the index file includes a plurality of tracks for indexing the series of entries, and the plurality of tracks include a property track, a text track, and a thumbnail track, and the plurality of tracks uses the unique code to index the series of entries, wherein the property track includes a header portion having a first fixed length, a basic property portion having a second fixed length, and a property extension portion having a variable length, and wherein the parent entry represents a folder which a file associated with a child entry belongs to.

3. A reproduction apparatus for reproducing files recorded on a predetermined recording medium based on a predetermined index file, comprising:

the index file being formed from a series of entries each in the form of a block of extract information relating to and coordinated with one of the files, the index file further registering parent entry information regarding a parent entry of each entry;

information regarding decoding of the files being registered in corresponding ones of the entries;

means for selecting those ones of the files which can be decoded normally based on the information regarding decoding in the index file and displaying a user interface of the selected files, wherein a unique code is allocated to each entry, when the index file includes a predetermined number of property flags for each entry, the predetermined number of property flags including a first flag to identify whether the entry represents a folder, a second flag to identify whether the entry is a favorite entry set by a user, a third flag to identify whether the entry is valid set in accordance with a deletion of the file associated with the entry, and a fourth flag to identify whether the file associated with the entry refers to another file, wherein the index file includes a plurality of tracks for indexing the series of entries, and the plurality of tracks include a property track, a text track, and a thumbnail track, and the plurality of tracks uses the unique code to index the series of entries, wherein the property track includes a header portion having a first fixed length, a basic property portion having a second fixed length, and a property extension portion having a variable length, and wherein the parent entry represents a folder which a file associated with a child entry belongs to.

4. The recording apparatus according to claim 1, wherein the information regarding decoding of the files includes a type of a codec.

5. The file management method according to claim 2, wherein the information regarding decoding of the files includes a type of a codec.

6. The reproduction apparatus according to claim 3, wherein the information regarding decoding of the files includes a type of a codec.

* * * * *